US007630902B2

(12) United States Patent
You

(10) Patent No.: US 7,630,902 B2

(45) Date of Patent: Dec. 8, 2009

(54) APPARATUS AND METHODS FOR DIGITAL AUDIO CODING USING CODEBOOK APPLICATION RANGES

(75) Inventor: Yuli You, Thousand Oaks, CA (US)

(73) Assignee: Digital Rise Technology Co., Ltd., Guangzhou, Guangdong (CN)

( * ) Notice: Subject to any disclaimer, the term of this patent is extended or adjusted under 35 U.S.C. 154(b) by 839 days.

(21) Appl. No.: 11/029,722

(22) Filed: Jan. 4, 2005

(65) Prior Publication Data

US 2006/0074642 A1 Apr. 6, 2006

Related U.S. Application Data

(60) Provisional application No. 60/610,674, filed on Sep. 17, 2004.

(51) Int. Cl.

| | |
|---|---|
| ***G10L 11/00*** | (2006.01) |
| ***G10L 19/00*** | (2006.01) |
| ***G10L 19/14*** | (2006.01) |
| ***G10L 19/12*** | (2006.01) |
| ***G10L 19/02*** | (2006.01) |
| ***G10L 21/04*** | (2006.01) |
| ***H04B 1/66*** | (2006.01) |
| ***H04N 7/12*** | (2006.01) |
| ***H04N 11/02*** | (2006.01) |

(52) U.S. Cl. ....................... 704/500; 704/200; 704/201; 704/211; 704/212; 704/222; 704/229; 704/230; 704/503; 375/240; 375/240.22; 375/240.25

(58) Field of Classification Search ................. 704/200, 704/201, 211, 212, 222, 229, 230, 500, 503; 375/240.22, 240, 240.25

See application file for complete search history.

(56) References Cited

U.S. PATENT DOCUMENTS 5,214,742 A 5/1993 Edler
5,321,729 A 6/1994 Schroder et al.
5,481,614 A * 1/1996 Johnston ........................ 381/2

(Continued)

FOREIGN PATENT DOCUMENTS

WO WO/9245153 9/1992

OTHER PUBLICATIONS

"0.8 1.2Vorbis I specification", downloaded from http://xiph.org/vorbis/doc/Vorbis_I_spec.pdf., Jul. 2004, pp. 1-68.

(Continued)

*Primary Examiner*—David R Hudspeth
*Assistant Examiner*—Paras Shah
(74) *Attorney, Agent, or Firm*—Joseph G. Swan, P.C.

(57) ABSTRACT

A low bit rate digital audio coding system includes an encoder which assigns codebooks to groups of quantization indexes based on their local properties resulting in codebook application ranges that are independent of block quantization boundaries. The invention also incorporates a resolution filter bank, or a tri-mode resolution filter bank, which is selectively switchable between high and low frequency resolution modes or high, low and intermediate modes such as when detecting transient in a frame. The result is a multichannel audio signal having a significantly lower bit rate for efficient transmission or storage. The decoder is essentially an inverse of the structure and methods of the encoder, and results in a reproduced audio signal that cannot be audibly distinguished from the original signal.

78 Claims, 18 Drawing Sheets

U.S. PATENT DOCUMENTS

| | | | | | |
|---|---|---|---|---|---|
| 5,822,723 | A * | 10/1998 | Kim et al. | | 704/222 |
| 5,848,391 | A | 12/1998 | Bosi et al. | | |
| 5,852,806 | A * | 12/1998 | Johnston et al. | | 704/500 |
| 6,226,608 | B1 | 5/2001 | Fielder et al. | | |
| 6,266,644 | B1 * | 7/2001 | Levine | | 704/503 |
| 6,487,535 | B1 * | 11/2002 | Smyth et al. | | 704/500 |
| 6,704,705 | B1 * | 3/2004 | Kabal et al. | | 704/230 |
| 6,952,671 | B1 * | 10/2005 | Kolesnik et al. | | 704/222 |
| 2001/0027392 | A1 * | 10/2001 | Wiese, Jr. | | 704/230 |
| 2003/0112869 | A1 * | 6/2003 | Chen et al. | | 375/240.12 |
| 2003/0115052 | A1 * | 6/2003 | Chen et al. | | 704/230 |
| 2004/0078205 | A1 * | 4/2004 | Liljeryd et al. | | 704/503 |
| 2004/0133423 | A1 * | 7/2004 | Crockett | | 704/229 |
| 2004/0181403 | A1 * | 9/2004 | Hsu | | 704/230 |
| 2005/0031039 | A1 * | 2/2005 | Chou et al. | | 375/240.18 |
| 2005/0144017 | A1 * | 6/2005 | Kabi et al. | | 704/500 |
| 2005/0192765 | A1 | 9/2005 | Slothers et al. | | |

OTHER PUBLICATIONS

Ted Painter and Andreas Spanias, "Perceptual Coding of Digital Audio", Proceedings of the IEEE, vol. 88, 88, No. 4, April 2000, pp. 451-513.

* cited by examiner

APPARATUS AND METHODS FOR DIGITAL AUDIO CODING USING CODEBOOK APPLICATION RANGES

RELATED APPLICATION

This application claims priority to U.S. Provisional Application Ser. No. 60/610,674, filed Sep. 17, 2004.

BACKGROUND OF THE INVENTION

The present invention generally relates to methods and systems for encoding and decoding a multi-channel digital audio signal. More particularly, the present invention relates to low a bit rate digital audio coding system that significantly reduces the bit rate of multichannel audio signals for efficient transmission or storage while achieving transparent audio signal reproduction, i.e., the reproduced audio signal at the decoder side cannot be distinguished from the original signal even by expert listeners.

A multichannel digital audio coding system usually consists of the following components: a time-frequency analysis filter bank which generates a frequency representation, call subband samples or subband signals, of input PCM (Pulse Code Modulation) samples; a psychoacoustic model which calculates, based on perceptual properties of human ears, a masking threshold below which quantization noise is unlikely to be audible; a global bit allocator which allocates bit resources to each group of subband samples so that the resulting quantization noise power is below the masking threshold; multiple quantizers which quantize subband samples according the bits allocated; multiple entropy coders which reduces statistical redundancy in the quantization indexes; and finally a multiplexer which packs entropy codes of the quantization indexes and other side information into a whole bit stream.

For example, Dolby AC-3 maps input PCM samples into frequency domain using a high frequency resolution MDCT (modified discrete cosine transform) filter bank whose window size is switchable. Stationary signals are analyzed with a 512-point window while transient signals with a 256-point window. Subband signals from MDCT are represented as exponent/mantissa and are subsequently quantized. A forward-backward adaptive psychoacoustic model is deployed to optimize quantization and to reduce bits required to encode bit allocation information. Entropy coding is not used in order to reduce decoder complexity. Finally, quantization indexes and other side information are multiplexed into a whole AC-3 bit stream. The frequency resolution of the adaptive MDCT as configured in AC-3 is not well matched to the input signal characteristics, so its compression performance is very limited. The absence of entropy coding is another factor that limits its compression performance.

MPEG 1 & 2 Layer III (MP3) uses a 32-band polyphase filter bank with each subband filter followed by an adaptive MDCT that switches between 6 and 18 points. A sophisticated psychoacoustic model is used to guide its bit allocation and scalar nonuniform quantization. Huffman code is used to code the quantization indexes and much of other side information. The poor frequency isolation of the hybrid filter bank significantly limits its compression performance and its algorithm complexity is high.

DTS Coherent Acoustics deploys a 32-band polyphase filter bank to obtain a low resolution frequency representation of the input signal. In order to make up for this poor frequency resolution, ADPCM (Adaptive Differential Pulse Code Modulation) is optionally deployed in each subband. Uniform scalar quantization is applied to either the subband samples directly or to the prediction residue if ADPCM produces a favorable coding gain. Vector quantization may be optionally applied to high frequency subbands. Huffman code may be optionally applied to scalar quantization indexes and other side information. Since the polyphase filter bank+ADPCM structure simply cannot provide good time and frequency resolution, its compression performance is low.

MPEG 2 AAC and MPEG 4 AAC deploy an adaptive MDCT filter bank whose window size can switch between 256 and 2048. Masking threshold generated by a psychoacoustic model is used to guide its scalar nonuniform quantization and bit allocation. Huffman code is used to encode the quantization indexes and much of other side information. Many other tool boxes, such as TNS (temporal noise shaping), gain control (hybrid filter bank similar to MP3), spectral prediction (linear prediction within a subband), are employed to further enhance its compression performance at the expense of significantly increased algorithm complexity.

Accordingly, there is a continuing need for a low bit rate audio coding system which significantly reduces the bit rate of multi-channel audio signals for efficient transmission or storage, while achieving transparent audio signal reproduction. The present invention fulfills this need and provides other related advantages.

SUMMARY OF THE INVENTION

Throughout the following discussion, the term "analysis/synthesis filter bank" and the like refer to an apparatus or method that performs time-frequency analysis/synthesis. It may include, but is not limited to, the following:

Unitary transforms;

Time-invariant or time-variant bank of critically sampled, uniform, or nonuniform band-pass filters;

Harmonic or sinusoidal analyzer/synthesizer.

Polyphase filter banks, DFT (Discrete Fourier Transform), DCT (Discrete Cosine Transform), and MDCT are some of the widely used filter banks. The term "subband signal or subband samples" and the like refer to the signals or samples that come out of an analysis filter bank and go into a synthesis filter bank.

It is an objective of this invention to provide for low bit-rate coding of multichannel audio signal with the same level of compression performance as the state of the art but at low algorithm complexity.

This is accomplished on the encoding side by an encoder that includes:

1) Framer that segments input PCM samples into quasistationary frames whose size is a multiple of the number of subbands of the analysis filter bank and ranges from 2 to 50 ms in duration.
2) Transient detector that detects the existence of transient in the frame. An embodiment is based on thresholding the subband distance measure that is obtained from the subband samples of the analysis filter bank at low frequency resolution mode.
3) Variable resolution analysis filter bank that transforms the input PCM samples into subband samples. It may be implemented using one of the following:
   a) A filter bank that can switch its operation among high, medium, and low frequency resolution modes. The high frequency resolution mode is for stationary frames and the medium and low frequency resolution modes are for frames with transient. Within a frame that includes a transient, the low frequency resolution mode is applied to the transient segment and the medium resolution mode is applied to the rest of the frame. Under this framework, there are three kinds of frames:
  - i) Frames with the filter bank operating only at high frequency resolution mode for handling stationary frames.
  - ii) Frames with the filter bank operating at both medium and high temporal resolution modes for handling transient frames.
  - iii) Frames with the filter bank operating only at the medium resolution mode for handling slow transient frames.

Two preferred embodiments were given:
  - i) DCT implementation where the three levels of resolution correspond to three DCT block lengths.
  - ii) MDCT implementation where the three levels of resolution correspond to three MDCT block lengths or window lengths. A variety of window types are defined to bridge the transition between these windows.

b) A hybrid filter bank that is based on a filter bank that can switch its operation between high and low resolution modes.
  - i) When there is no transient in the current frame, it switches into high frequency resolution mode to ensure high compression performance for stationary segments.
  - ii) When there is transient in the current frame, it switches into low frequency resolution/high temporal resolution mode to avoid pre-echo artifacts. This low frequency resolution mode is further followed by a transient segmentation stage, that segments subband samples into stationary segments, and then optionally followed by either an arbitrary resolution filter bank or an ADPCM in each subband that, if selected, provides for frequency resolution tailored to each stationary segment.

Two embodiments were given, one based on DCT and the other on MDCT. Two embodiments for transient segmentation were given, one based on thresholding and the other on k-means algorithm, both using the subband distance measure.

2) Psychoacoustic model that calculates masking thresholds.

3) Optional sum/difference encoder that converts subband samples in left and right channel pairs into sum and difference channel pairs.

4) Optional joint intensity coder that extracts intensity scale factor (steering vector) of the joint channel versus the source channel, merges joint channels into the source channel, and discards the respective subband samples in the joint channels.

5) Global bit allocator that allocates bit resources to groups of subband samples so that their quantization noise power is below masking threshold.

6) Scalar quantizer that quantizes all subband samples using step size supplied by the bit allocator.

7) Optional interleaver that, when transient is present in the frame, may be optionally deployed to rearrange quantization indexes in order to reduce the total number of bits.

8) Entropy coder that assigns optimal codebooks, from a library of codebooks, to groups of quantization indexes based on their local statistical characteristics. It involves the following steps:
  - a) Assigns an optimal codebook to each quantization index, hence essentially converts quantization indexes into codebook indexes.
  - b) Segments these codebook indexes into large segments whose boundaries define the ranges of codebook application.

A preferred embodiment is described:
  - c) Blocks quantization indexes into granules, each of which consists of a fixed number of quantization indexes.
  - d) Determine the largest codebook requirement for each granule.
  - e) Assigns the smallest codebook to a granule that can accommodate its largest codebook requirement:
  - f) Eliminate isolated pockets of codebook indexes which are smaller than their immediate neighbors. Isolated pockets with deep dips into the codebook index that corresponds to zero quantization indexes may be excluded from this processing.

A preferred embodiment to encode the ranges of codebook application is the use of run-length code.

9) Entropy coder that encodes all quantization indexes using codebooks and their applicable ranges determined by the entropy codebook selector.

10) Multiplexer that packs all entropy codes of quantization indexes and side information into a whole bit stream, which is structured such that the quantization indexes come before indexes for quantization step sizes. This structure makes it unnecessary to pack the number of quantization units for each transient segment into the bit stream because it can be recovered from the unpacked quantization indexes.

The decoder of this invention includes:

1) DEMUX that unpacks various words from the bit stream.

2) Quantization index codebook decoder that decodes entropy codebooks and their respective application ranges for the quantization indexes from the bit stream.

3) Entropy decoder that decodes quantization indexes from the bit stream.

4) Optional deinterleaver that optionally rearranges quantization indexes when transient is present in the current frame.

5) Number of quantization units reconstructor that reconstructs from the quantization indexes the number of quantization units for each transient segments using the following steps
  - a) Find the largest subband with non-zero quantization index for each transient segment.
  - b) Find the smallest critical band that can accommodate this subband. This is the number of quantization units for this transient segment.

6) Step size unpacker that unpacks quantization step sizes for all quantization units.

7) Inverse quantizer that reconstruct subband samples from quantization indexes and step sizes.

8) Optional joint intensity decoder that reconstructs subband samples of the joint channel from the subband samples of the source channel using joint intensity scale factors (steering vectors).

9) Optional sum/difference decoder that reconstructs left and right channel subband samples from sum and difference channel subband samples.

10) Variable resolution synthesis filter bank that reconstructs audio PCM samples from subband samples. This may be implemented by the following:
  - a) A synthesis filter bank that can switch its operation among high, medium, and low resolution modes.
  - b) A hybrid synthesis filter bank that is based on a synthesis filter bank that can switch between high and low resolution modes.

i) When the bit stream indicates that the current frame was encoded with the switchable resolution analysis filter bank in low frequency resolution mode, this synthesis filter bank is a two stage hybrid filter bank in which the first stage is either an arbitrary resolution synthesis filter bank or an inverse ADPCM, and the second stage is the low frequency resolution mode of an adaptive synthesis filter bank that can switch between high and low frequency resolution modes.

ii) When the bit stream indicates that the current frame was encoded with the switchable resolution analysis filter bank in high frequency resolution mode, this synthesis filter bank is simply the switchable resolution synthesis filter bank that is in high frequency resolution mode.

Finally, the invention allows for a low coding delay mode which is enabled when the high frequency resolution mode of the switchable resolution analysis filter bank is forbidden by the encoder and frame size is subsequently reduced to the block length of the switchable resolution filter bank at low frequency resolution mode or a multiple of it.

In accordance with the present invention, the method for encoding the multi-channel digital audio signal generally comprises a step of creating PCM samples from a multi-channel digital audio signal, and transforming the PCM samples into subband samples. A plurality of quantization indexes having boundaries are created by quantizing the subband samples. The quantization indexes are converted to codebook indexes by assigning to each quantization index the smallest codebook from a library of pre-designed codebooks that can accommodate the quantization index. The codebook indexes are segmented, and encoded before creating an encoded data stream for storage or transmission.

Typically, the PCM samples are input into quasi stationary frames of between 2 and 50 milliseconds (ms) in duration. Masking thresholds are calculated, such as using a psychoacoustic model. A bit allocator allocates bit resources into groups of subband samples, such that the quantization noise power is below the masking threshold.

The transforming step includes a step of using a resolution filter bank selectively switchable below high and low frequency resolution modes. Transients are detected, and when no transient is detected the high frequency resolution mode is used. However, when a transient is detected, the resolution filter bank is switched to a low frequency resolution mode. Upon switching the resolution filter bank to the low frequency resolution mode, subband samples are segmented into stationary segments. Frequency resolution for each stationary segment is tailored using an arbitrary resolution filter bank or adaptive differential pulse code modulation.

Quantization indexes may be rearranged when a transient is present in a frame to reduce the total number of bits. A run-length encoder can be used for encoding application boundaries of the optimal entropy codebook. A segmentation algorithm may be used.

A sum/difference encoder may be used to convert subband samples in left and right channel pairs into sum and different channel pairs. Also, a joint intensity coder may be used to extract intensity scale factor of a joint channel versus a source channel, and merging the joint channel into the source channel, and discarding all relative subband samples in the joint channels.

Typically, combining steps for creating the whole bit data stream is performed by using a multiplexer before storing or transmitting the encoded digital audio signal to a decoder.

The method for decoding the audio data bit stream comprises the steps of receiving the encoded audio data stream and unpacking the data stream, such as by using a demultiplexer. Entropy code book indexes and their respective application ranges are decoded. This may involve run-length and entropy decoders. They are further used to decode the quantization indexes.

Quantization indexes are rearranged when a transient is detected in a current frame, such as by the use of a deinterleaver. Subband samples are then reconstructed from the decoded quantization indexes. Audio PCM samples are reconstructed from the reconstructed subband samples using a variable resolution synthesis filter bank switchable between low and high frequency resolution modes. When the data stream indicates that the current frame was encoded with a switchable resolution analysis filter bank in low frequency resolution mode, the variable synthesis resolution filter bank acts as a two-stage hybrid filter bank, wherein a first stage comprises either an arbitrary resolution synthesis filter bank or an inverse adaptive differential pulse code modulation, and wherein the second stages the low frequency resolution mode of the variable synthesis filter bank. When the data stream indicates that the current frame was encoded with a switchable resolution analysis filter bank in high frequency resolution mode, the variable resolution syntheses filter bank operates in a high frequency resolution mode.

A joint intensity decoder may be used to reconstruct joint channel subband samples from source channel subband samples using joint intensity scale factors. Also a sum/difference decoder may be used to reconstruct left and right channel subband samples from the sum/difference channel subband samples.

The result of the present invention is a low bit rate digital audio coding system which significantly reduces the bit rate of the multi-channel audio signal for efficient transmission while achieving transparent audio signal reproduction such that it cannot be distinguished from the original signal.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention relates to a low bit rate digital audio encoding and decoding system that significantly reduces the bit rate of multi-channel audio signals for efficient transmission or storage, while achieving transparent audio reproduction. That is, the bit rate of the multichannel encoded audio signal is reduced by using a low algorithmic complexity system, yet the reproduced audio signal on the decoder side, cannot be distinguished from the original signal, even by expert listeners.

Figure 1:
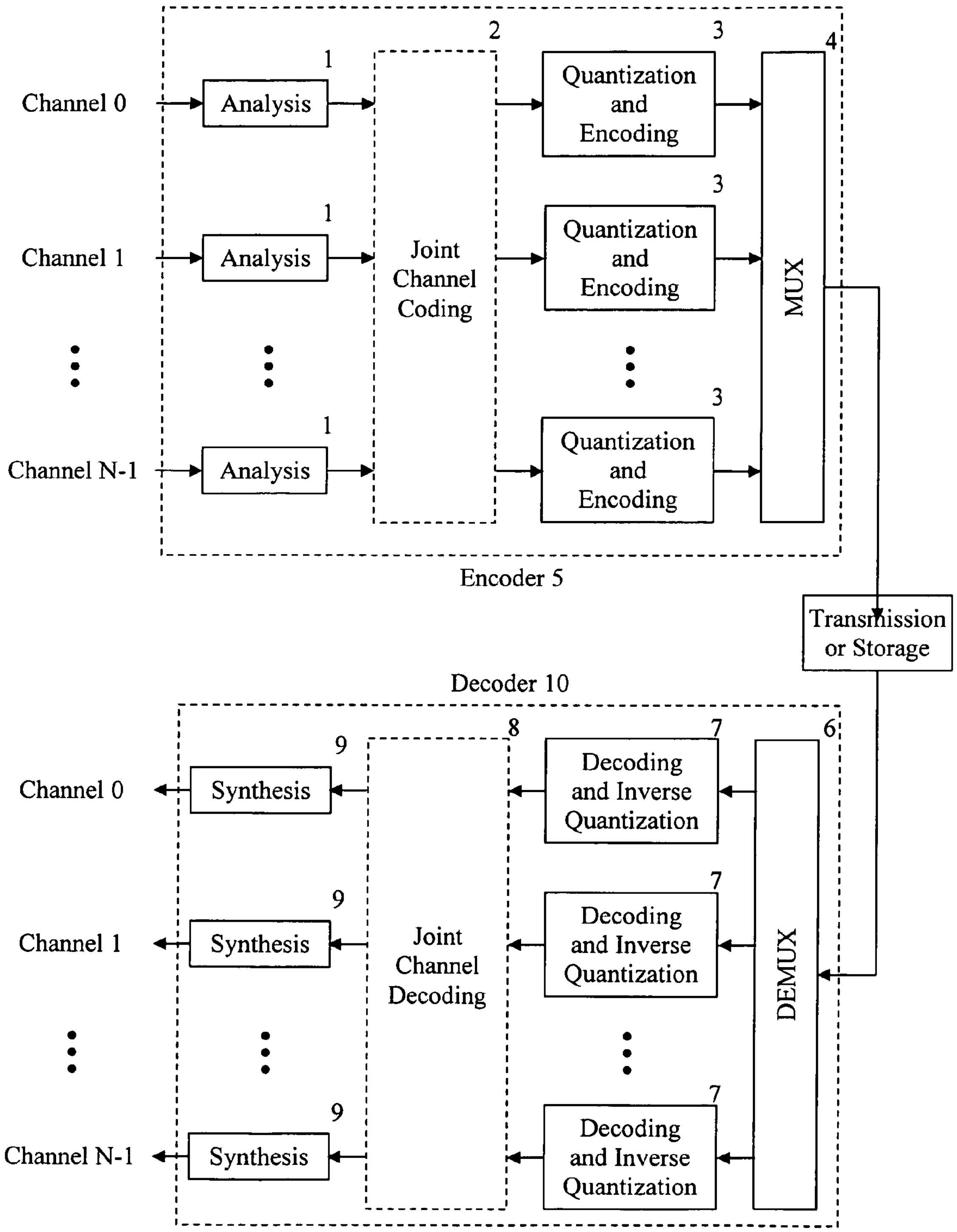
FIG. 1 is a diagrammatic view depicting the encoding and decoding of the multi-channel digital audio signal, in accordance with the present invention.

As shown in FIG. 1, the encoder 5 of this invention takes multichannel audio signals as input and encode them into a bit stream with significantly reduced bit rate suitable for transmission or storage on media with limited channel capacity. Upon receiving bit stream generated by encoder 5, the decoder 10 decodes it and reconstructs multichannel audio signals that cannot be distinguished from the original signals even by expert listeners.

Inside the encoder 5 and decoder 10, multichannel audio signals are processed as discrete channels. That is, each channel is treated in the same way as other channels, unless joint channel coding 2 is clearly specified. This is illustrated in FIG. 1 with overly simplified encoder and decoder structures.

With this overly simplified encoder structure, the encoding process is described as follows. The audio signal from each channel is first decomposed into subband signals in the analysis filter bank stage 1. Subband signals from all channels are optionally fed to the joint channel coder 2 that exploits perceptual properties of human ears to reduce bit rate by combining subband signals corresponding to the same frequency band from different channels. Subband signals, which may be jointly coded in 2, are then quantized and entropy encoded in 3. Quantization indexes or their entropy codes as well as side information from all channels are then multiplexed in 4 into a whole bit stream for transmission or storage.

On the decoding side, the bit stream is first demultiplexed in 6 into side information as well as quantization indexes or their entropy codes. Entropy codes are decoded in 7 (note that entropy decoding of prefix code, such as Huffman code, and demultiplexing are usually performed in an integrated single step). Subband signals are reconstructed in 7 from quantization indexes and step sizes carried in the side information. Joint channel decoding is performed in 8 if joint channel coding was done in the encoder. Audio signals for each channel are then reconstructed from subband signals in the synthesis stage 9.

The above overly simplified encoder and decoder structures are used solely to illustrate the discrete nature of the encoding and decoding methods presented in this invention. The encoding and decoding methods that are actually applied to each channel of audio signal are very different and much more complex. These methods are described as follows in the context of one channel of audio signal, unless otherwise stated.

Encoder

Figure 2:
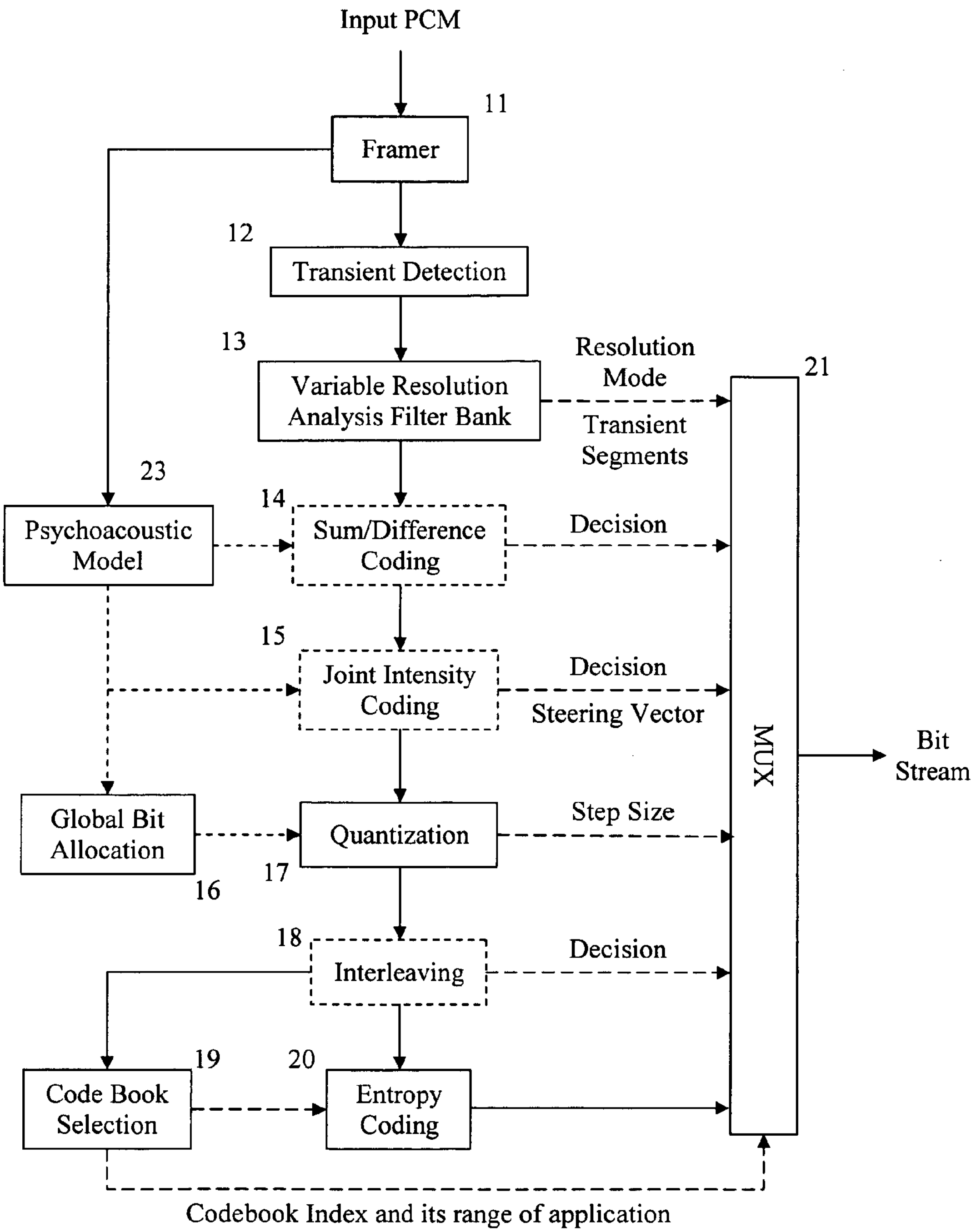
FIG. 2 is a diagrammatic view of an exemplary encoder utilized in accordance with the present invention.

The general method for encoding one channel of audio signal is depicted in FIG. 2 and described as follows:

The framer 11 segments the input PCM samples into quasistationary frames ranging from 2 to 50 ms in duration. The exact number of PCM samples in a frame must be a multiple of the maximum of the numbers of subbands of various filter banks used in the variable resolution time-frequency analysis filter bank 13. Assuming that maximum number of subbands is N, the number of PCM samples in a frame is $$L=k\cdot N$$

where k is a positive integer.

The transient analysis 12 detects the existence of transients in the current input frame and passes this information to the Variable Resolution Analysis Bank 13.

Any of the known transient detection methods can be employed here. In one embodiment of this invention, the input frame of PCM samples are fed to the low frequency resolution mode of a variable resolution analysis filter bank. Let s (m,n) denote the output samples from this filter bank, where m is the subband index and n is the temporal index in the subband domain. Throughout the following discussion, the term "transient detection distance" and the like refer to a distance measure defined for each temporal index as:

$$E(n)=\sum_{m=0}^{M-1}|s(m,n)|$$

or $$E(n)=\sum_{m=0}^{M-1}s^2(m,n)$$

where M is the number subband for the filter bank. Other types of distance measures can also be applied in a similar way. Let $$E_{max} = \underset{n}{\mathrm{Max}}E(n) \text{ and } E_{min} = \underset{n}{\mathrm{Min}}E(n)$$

be the maximum and minimum value of this distance, the existence of transient is declared if $$\frac{E_{max} - E_{min}}{E_{max} + E_{min}} > \text{Threshold}$$

where the threshold may be set to 0.5.

Figure 7:
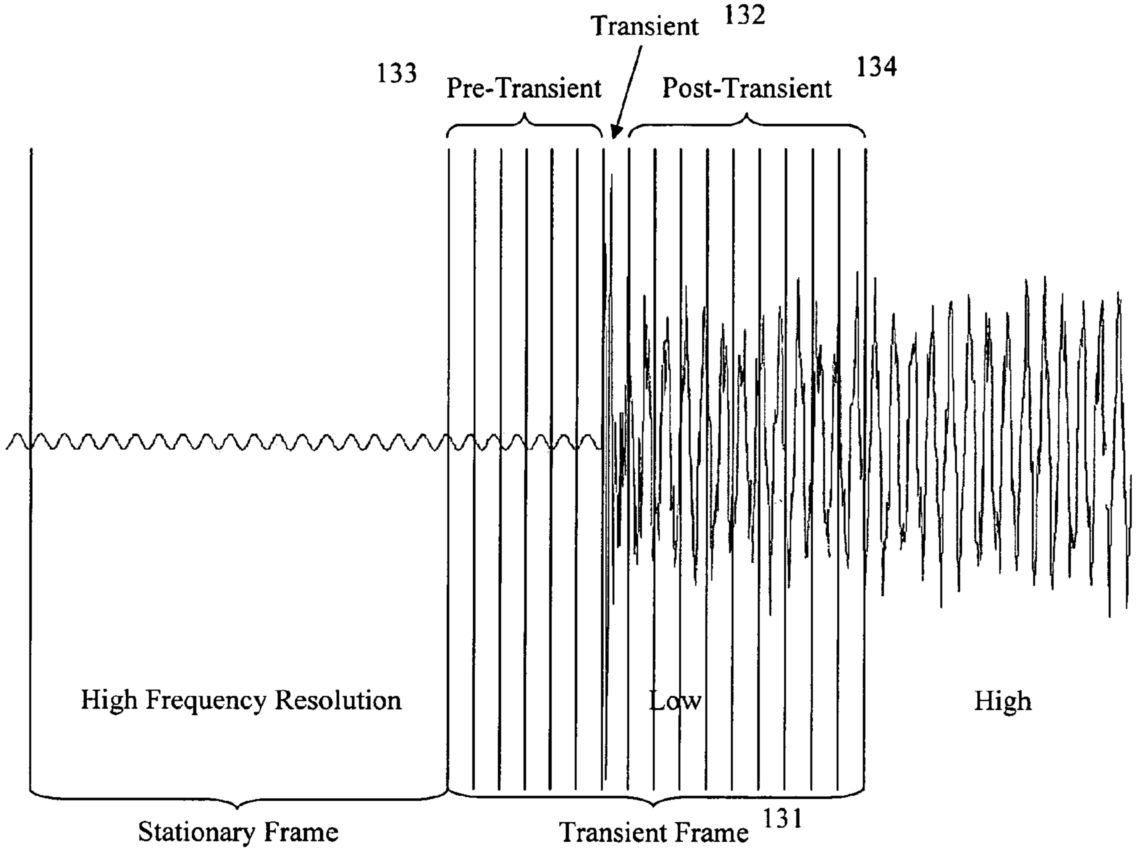
FIG. 7 is a diagrammatic view of the application of a switchable filter bank with two resolution modes, in accordance with the present invention.

The present invention utilizes a variable resolution analysis filter bank 13. There are many known methods to implement variable resolution analysis filter bank. A prominent one is the use of filter banks that can switch its operation between high and low frequency resolution modes, with the high frequency resolution mode to handle stationary segments of audio signals and low frequency resolution mode to handle transients. Due to theoretical and practical constraints, however, this switching of resolution cannot occur arbitrarily in time. Instead, it usually occurs at frame boundary, i.e., a frame is processed with either high frequency resolution mode or low frequency resolution mode. As shown in FIG. 7, for the transient frame 131, the filter bank has switched to low frequency resolution mode to avoid pre-echo artifacts. Since the transient 132 itself is very short, but the pre-transient 133 and post-transient 134 segments of the frame are much longer, so the filter bank at the low frequency resolution mode is obviously a mismatch to these stationary segments. This significantly limits the overall coding gain that can be achieved for the whole frame.

Three methods are proposed by this invention to address this problem. The basic idea is to provide for the stationary majority of a transient frame with higher frequency resolution within the switchable resolution structure.

Half Hybrid Filter Bank

Figure 3:
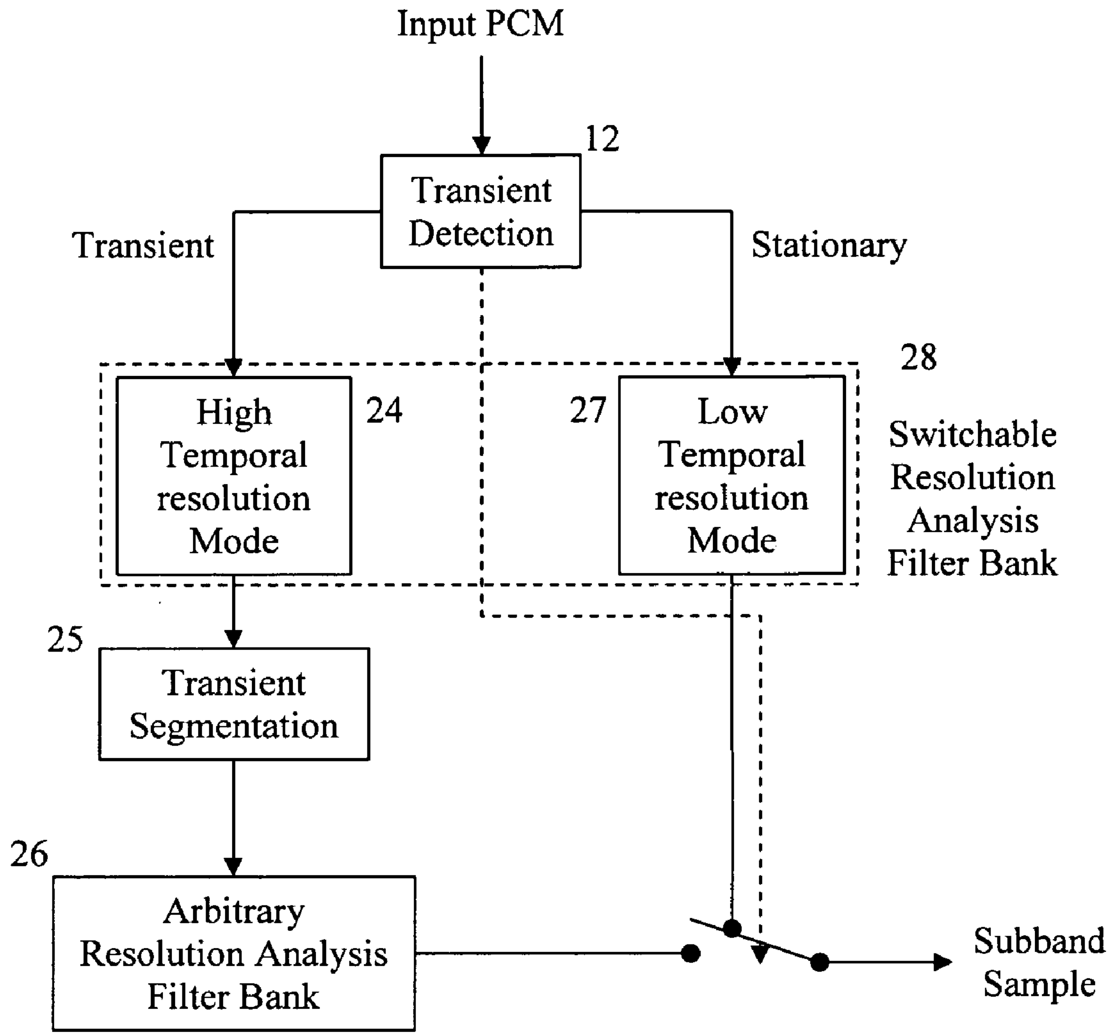
FIG. 3 is a diagrammatic view of a variable resolution analysis filter bank, with arbitrary resolution filter banks, used in accordance with the present invention.

As shown in FIG. 3, it is essentially a hybrid filter bank consisting of a switchable resolution analysis filter bank 28 that can switch between high and low frequency resolution modes and, when in low frequency resolution mode 24, followed by a transient segmentation section 25 and then an optional arbitrary resolution analysis filter bank 26 in each subband.

When the transient detector 12 does not detect the existence of transient, the switchable resolution analysis filter bank 28 enters low temporal resolution mode 27 which ensures high frequency resolution to achieve high coding gain for audio signals with strong tonal components.

Figure 6:
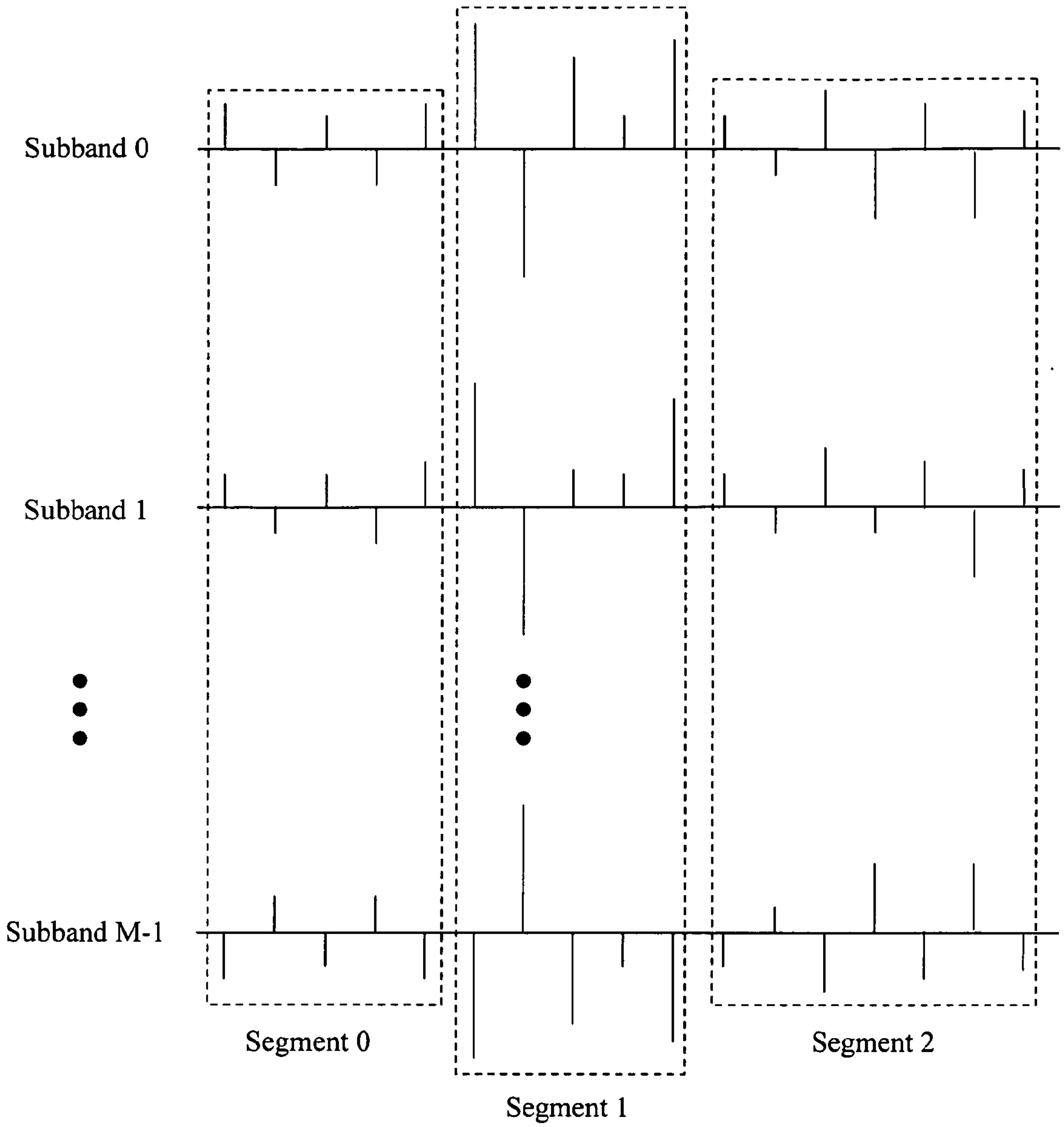
FIG. 6 is a diagrammatic view of transient segmentation, in accordance with the present invention.

When the transient detector 12 detects the existence of transient, the switchable resolution analysis filter bank 28 enters high temporal resolution mode 24. This ensures that the transient is handled with good temporal resolution to prevent pre-echo. The subband samples thus generated are segmented into quasistationary segments as shown in FIG. 6 by the transient segmentation section 25. Throughout the following discussion, the term "transient segment" and the like refer to these quasistationary segments. This is followed by the arbitrary resolution analysis filter bank 26 in each subband, whose number of subbands is equal to the number of subband samples of each transient segment in each subband.

The switchable resolution analysis filter bank 28 can be implemented using any filter bank that can switch its operation between high and low frequency resolution modes. An embodiment of this invention deploys a pair of DCT with a small and large transform length, corresponding to the low and high frequency resolution. Assuming a transform length of M, the subband samples of type 4 DCT is obtained as:

$$s(m,n) = \sqrt{\frac{2}{M}} \sum_{k=0}^{M-1} \cos\left[\frac{\pi}{M}(k+0.5)(n+0.5)\right] \cdot x(mM+k)$$

where x(.) is the input PCM samples. Other forms of DCT can be used in place of type 4 DCT.

Since DCT tends to cause blocking artifact, a better embodiment of this invention deploys modified DCT (MDCT):

$$s(m,n) = \sqrt{\frac{2}{M}} \sum_{k=0}^{2M-1} \cos\left[\frac{\pi}{M}\left(k+0.5+\frac{M}{2}\right)(n+0.5)\right] \cdot w(k) \cdot x(mM-M+k)$$

where w(.) is a window function.

The window function must be power-symmetric in each half of the window:

$$w^2(k)+w^2(M-k)=1 \text{ for } k=0, \ldots, M-1$$

$$w^2(k+M)+w^2(2M-1-k)=1 \text{ for } k=0, \ldots, M-1$$

in order to guarantee perfect reconstruction.

While any window satisfying the above conditions can be used, only the following sine window $$w(k) = \pm\sin\left[(k+0.5)\frac{\pi}{2M}\right] \text{ for } k = 0, \ldots, 2M-1$$

has the good property that the DC component in the input signal is concentrated to the first transform coefficient.

Figure 5:
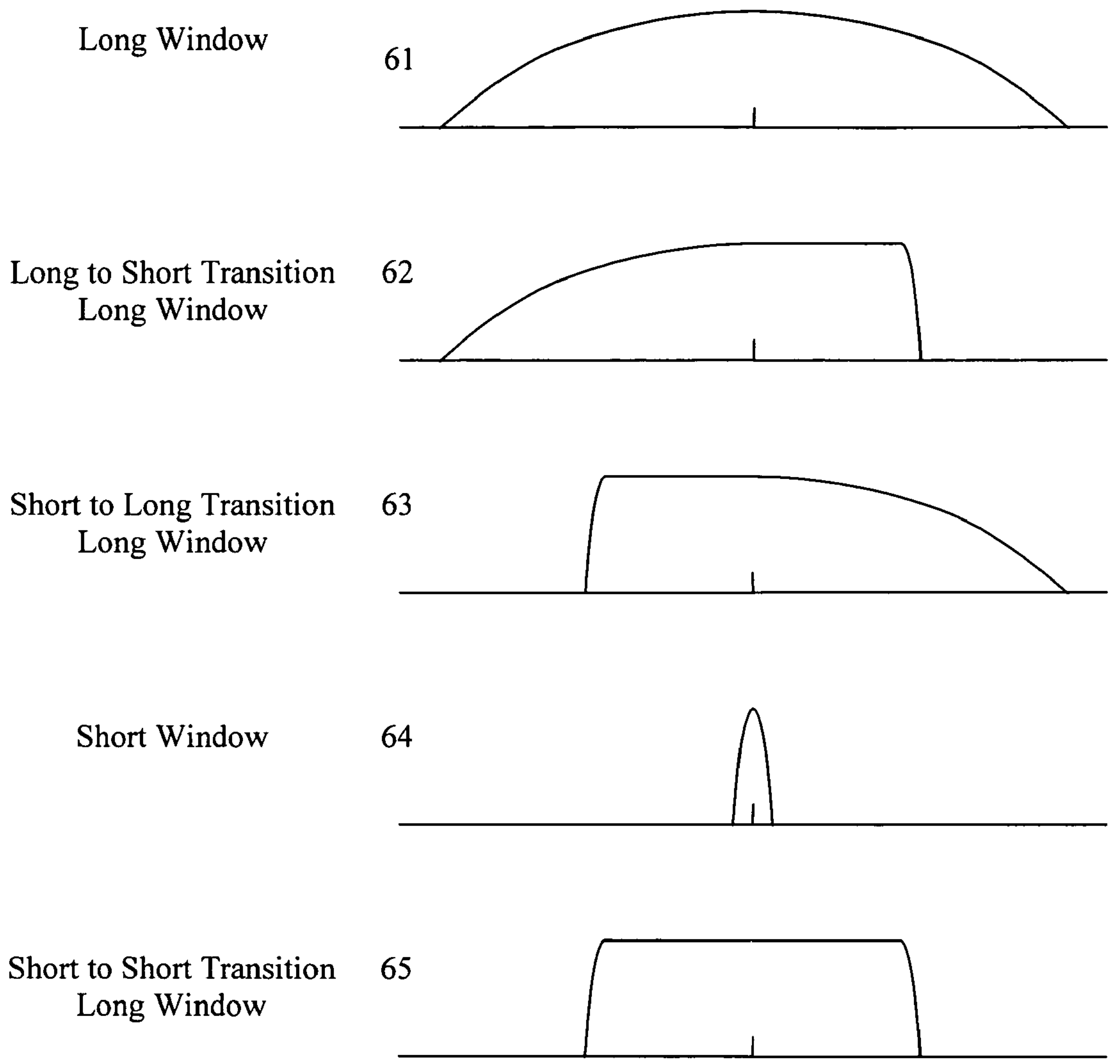
FIG. 5 are diagrammatic views of allowed window types for switchable MDCT, in accordance with the present invention.

In order to maintain perfect reconstruction when MDCT is switched between high and low frequency modes, or long and short windows, the overlapping part of the short and long windows must have the same shape. Depending the transient property of the input PCM samples, the encoder may choose a long window (as shown by the first window 61 in FIG. 5), switch to a sequence of short windows (as shown by the fourth window 64 in FIG. 5), and back. The long to short transition long window 62 and the short to long transition long window 63 windows (shown in FIG. 5) are needed to bridge such switching. The short to short transition long window 65 in FIG. 5 is useful when two transients are very close to each other but not close enough to warrant continuous application of short windows. The encoder needs to convey the window type used for each frame to the decoder so that the same window is used to reconstruct the PCM samples.

Figure 17:
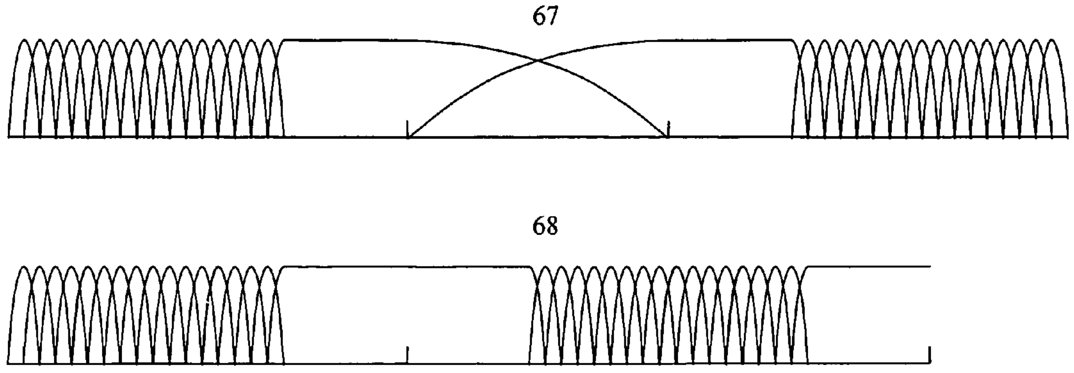
FIG. 17 is a diagrammatic view of the advantage of the short to short transition long window in handling transients spaced as close as just one frame apart.
Figure 18:
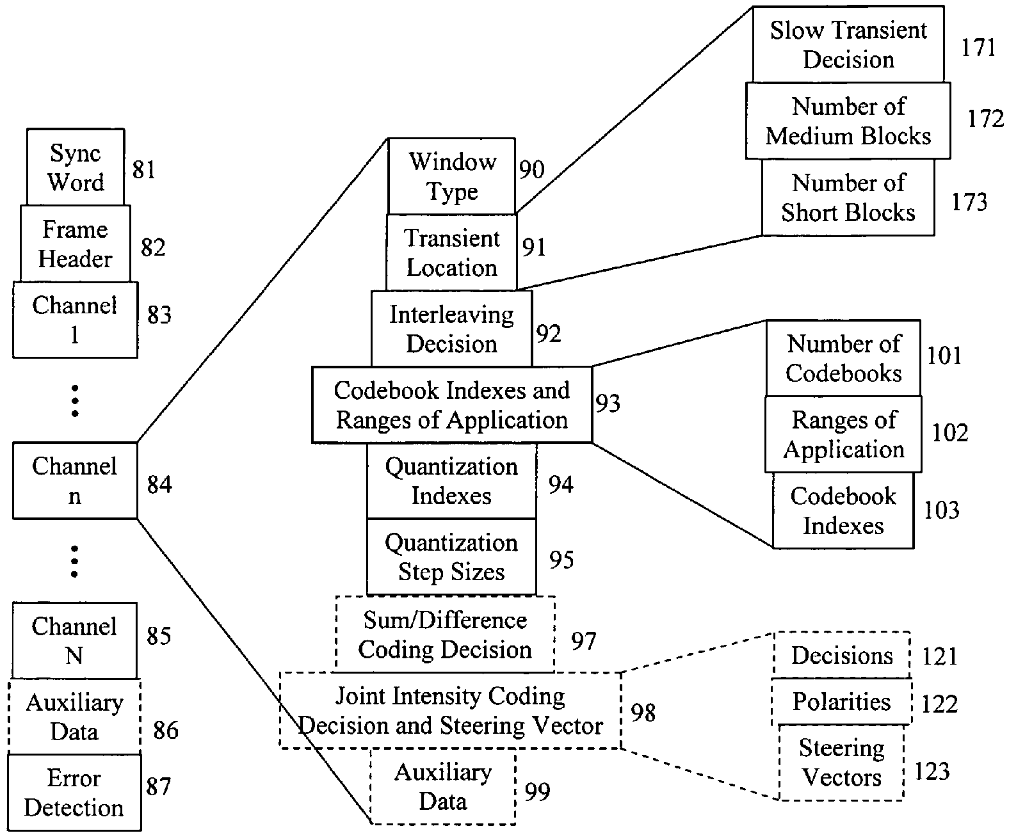
FIG. 18 is a diagrammatic view of a bit stream structure when the tri-mode switchable filter bank is used, in accordance with the present invention.

The advantage of the short to short transition long window is that it can handle transients spaced as close as just one frame apart. As shown at the top 67 of FIG. 17, the MDCT of prior art can handle transients spaced at least two frames apart. This is reduced to just one frame using this short to short transition long window, as shown at the bottom 68 of FIG. 17.

The invention then performs transient segments 25. Transient segments may be represented by a binary function that indicates the location of transients, or segmentation boundaries, using the change of its value from 0 to 1 or 1 to 0. For example, the quasistationary segments in FIG. 6 may be represented as follows:

$$T(n) = \begin{cases} 0, & \text{for } n = 0, 1, 2, 3, 4 \\ 1, & \text{for } n = 5, 6, 7, 8, 9 \\ 0, & \text{for } n = 10, 11, 12, 13, 14, 15, 16 \end{cases}$$

Note that T(n)=0 does not necessarily mean that the energy of audio signal at temporal index n is high and vice versa. Throughout the following discussion, this function T(n) is referred to as "transient segment function" and the like. The information carried by this segment function must be conveyed to the decoder either directly or indirectly. Run-length coding that encodes the length of zero and one runs is an efficient choice. For the particular example above, the T(n) can be conveyed to the decoder using run-length codes of 5, 5, and 7. The run-length code can further be entropy-coded.

The transient segmentation section 25 may be implemented using any of the known transient segmentation methods. In one embodiment of this invention, transient segmentation can be accomplished by simple thresholding of the transient detection distance.

$$T(n) = \begin{cases} 0, & \text{if } E(n) < \text{Threshold}; \\ 1, & \text{otherwise.} \end{cases}$$

The threshold may be set as $$\text{Threshold} = k \cdot \frac{E_{max} + E_{min}}{2}$$

where k is an adjustable constant.

A more sophisticated embodiment of this invention is based on the k-means clustering algorithm which involves the following steps:

1) The transient segmentation function T(n) is initialized, possibly with the result from the above thresholding approach.

2) The centroid for each cluster is calculated:

$$C0 = \frac{\sum_{if\ T(n)=0} E(n)}{\sum_{if\ T(n)=0} 1}$$

for cluster associated with T(n)=0.

$$C1 = \frac{\sum_{if\ T(n)=1} E(n)}{\sum_{if\ T(n)=1} 1}$$

for cluster associated with T(n)=1.

3) The transient segmentation function T(n) is assigned based on the following rule $$T(n) = \begin{cases} 0, & \text{if } |E(n) - C0| < |E(n) - C1|; \\ 1, & \text{otherwise.} \end{cases}$$

4). Go to step 2.

The arbitrary resolution analysis filter bank 26 is essentially a transform, such as a DCT, whose block length equals to the number of samples in each subband segment. Suppose there are 32 subband samples per subband within a frame and they are segmented as (9, 3, 20), then three transforms with block length of 9, 3, and 20 should be applied to the subband samples in each of the three subband segments, respectively. Throughout the following discussion, the term "subband segment" and the like refer to subband samples of a transient segment within a subband. The transform in the last segment of (9, 3, 20) for the m-th subband may be illustrated using Type 4 DCT as follows $$u(m, n) = \sqrt{\frac{2}{20}} \sum_{k=0}^{20-1} \cos\left[\frac{\pi}{20}(k + 0.5)(n + 0.5)\right] \cdot s(m, 12 + k)$$

This transform should increase the frequency resolution within each transient segment, so a favorable coding gain is expected. In many cases, however, if the coding gain is less than one or too small, then it might be beneficial to discard the result of such transform and inform the decoder of this decision via side information. Due to the overhead related to side information, it might improve the overall coding gain if the decision of whether the transform result is discarded is based on a group of subband segments, i.e., one bit is used to convey this decision for a group of subband segments, instead of one bit for each subband segment.

Throughout the following discussion, the term "quantization unit" and the like refer to a contiguous group of subband segments within a transient segment that belong to the same psychoacoustic critical band. A quantization unit might be a good grouping of subband segments for the above decision making. If this is used, the total coding gain is calculated for all subband segments in a quantization unit. If the coding gain is more than one or some other higher threshold, the transform results are kept for all subband segments in the quantization unit. Otherwise, the results are discarded. Only one bit is needed to convey this decision to the decoder for all the subband segments in the quantization unit.

Switchable Filter Bank Plus ADPCM

Figure 4:
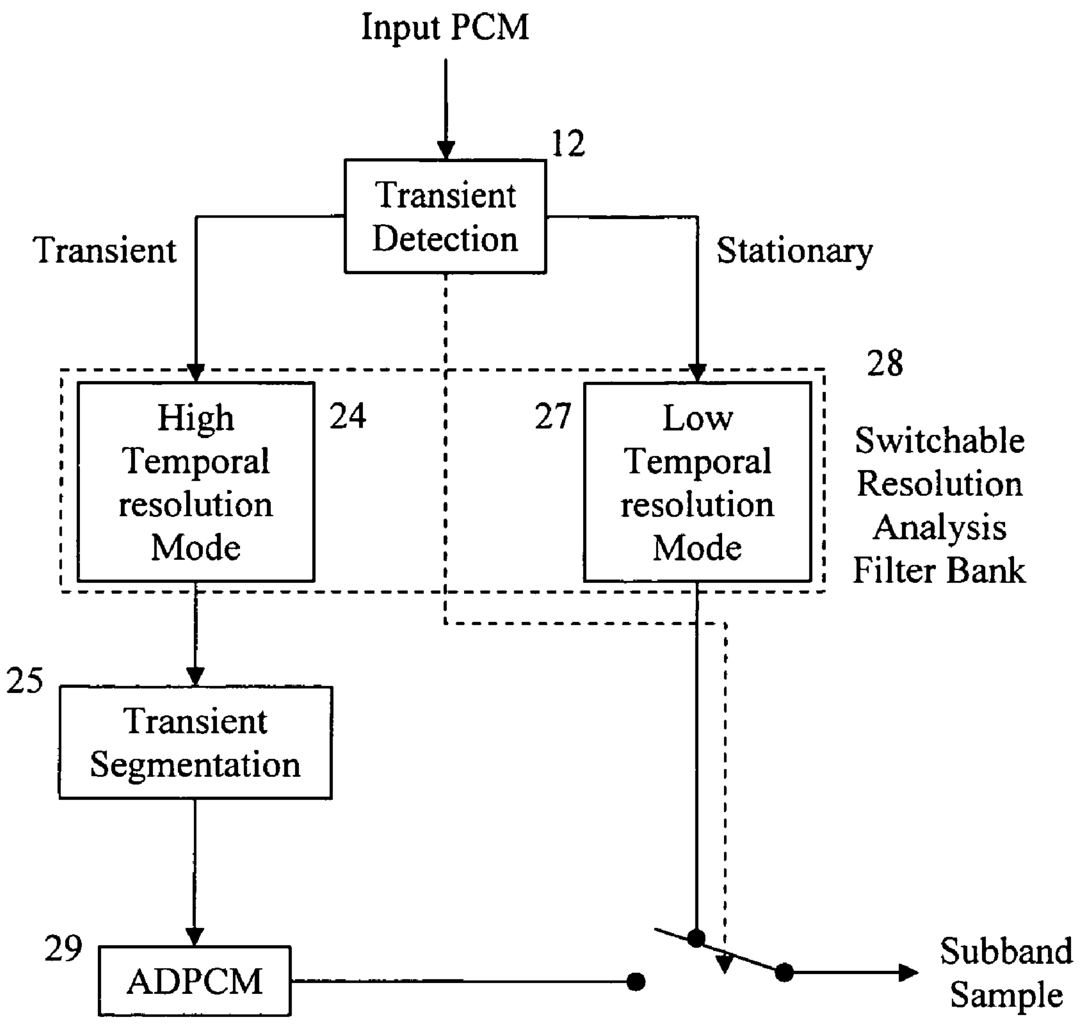
FIG. 4 is a diagrammatic view of a variable resolution analysis filter bank with ADPCM.

As shown in FIG. 4, it is basically the same as that in FIG. 3, except that the arbitrary resolution analysis filter bank 26 is replaced by ADPCM 29. The decision of whether ADPCM should be applied should again be based on a group of subband segments, such as a quantization unit, in order to reduce the cost of side information. The group of subband segments can even share one set of prediction coefficients. Known methods for the quantization of prediction coefficients, such as those involving LAR (Log Area Ratio), IS (Inverse Sine), and LSP (Line Spectrum Pair), can be applied here.

Tri-mode Switchable Filter Bank

Unlike the usual switchable filter banks that only have high and low resolution modes, this filter bank can switch its operation among high, medium, and low resolution modes. The high and low frequency resolution modes are intended for application to stationary and transient frames, respectively, following the same kind of principles as the two-mode switchable filter banks. The primary purpose of the medium resolution mode is to provide better frequency resolution to the stationary segments within a transient frame. Within a frame that includes a transient, therefore, the low frequency resolution mode is applied to the transient segment and the medium resolution mode is applied to the rest of the frame. This indicates that, unlike prior art, the switchable filter bank can operate at two resolution modes for audio data within a single frame. The medium resolution mode can also be used to handle frames with smooth transients.

Throughout the following discussion, the term "long block" and the like refer to one block of samples that the filter bank at high frequency resolution mode outputs at each time instance; the term "medium block" and the like refer to one block of samples that the filter bank at medium frequency resolution mode outputs at each time instance; the term "short block" and the like refer to one block of samples that the filter bank at low frequency resolution mode outputs at each time instance. With these three definitions, the three kinds of frames can be described as follows:

- Frames with the filter bank operating at high frequency resolution mode to handle stationary frames. Each of such frames usually consists of one or more long blocks.
- Frames with the filter bank operating at high and medium temporal resolution mode to handle frames with transient. Each of such frames consists of a few medium blocks and a few short blocks. The total number of samples for all short blocks is equal to the number of samples for one medium block.
- Frames with the filter bank operating at medium resolution mode to handle frames with smooth transients. Each of such frames consists of a few medium blocks.

Figure 8:
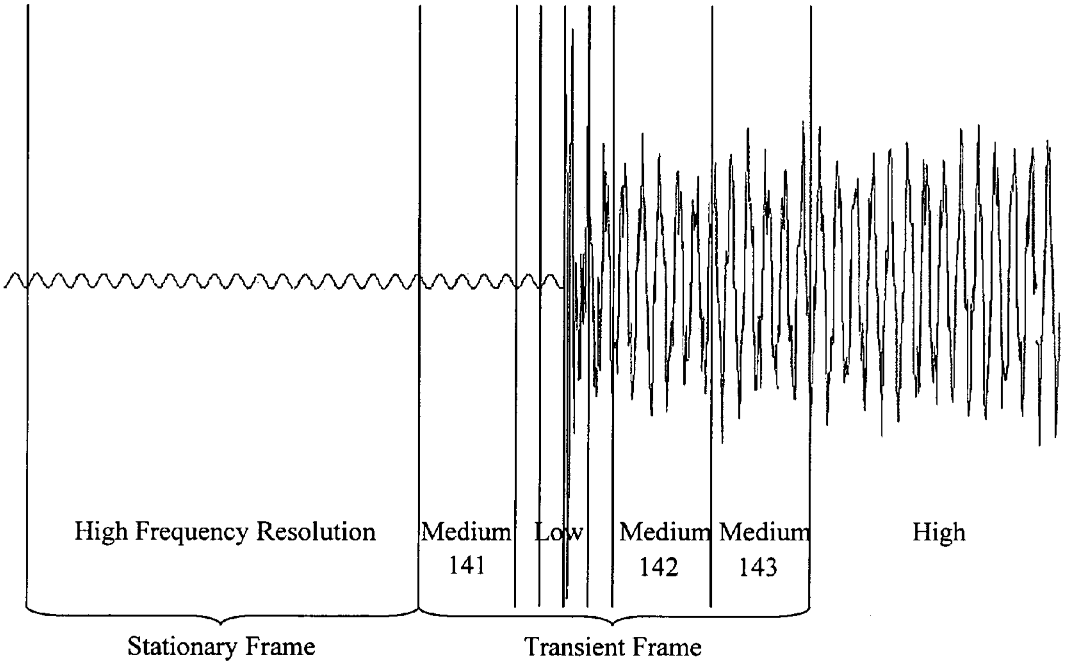
FIG. 8 is a diagrammatic view of the application of a switchable filter bank with three resolution modes, in accordance with the present invention.

The advantage of this new method is shown in FIG. 8. It is essentially the same as that in FIG. 7, except that the many of the segments (141, 142, and 143) that were processed by low frequency resolution mode in FIG. 7 are now processed by medium frequency resolution mode. Since these segments are stationary, the medium frequency resolution mode is obviously a better match than the low frequency resolution mode. Therefore, higher coding gain can be expected.

An embodiment of this invention deploys a triad of DCT with small, medium, and large block lengths, corresponding to the low, medium, and high frequency resolution modes.

Figure 9:
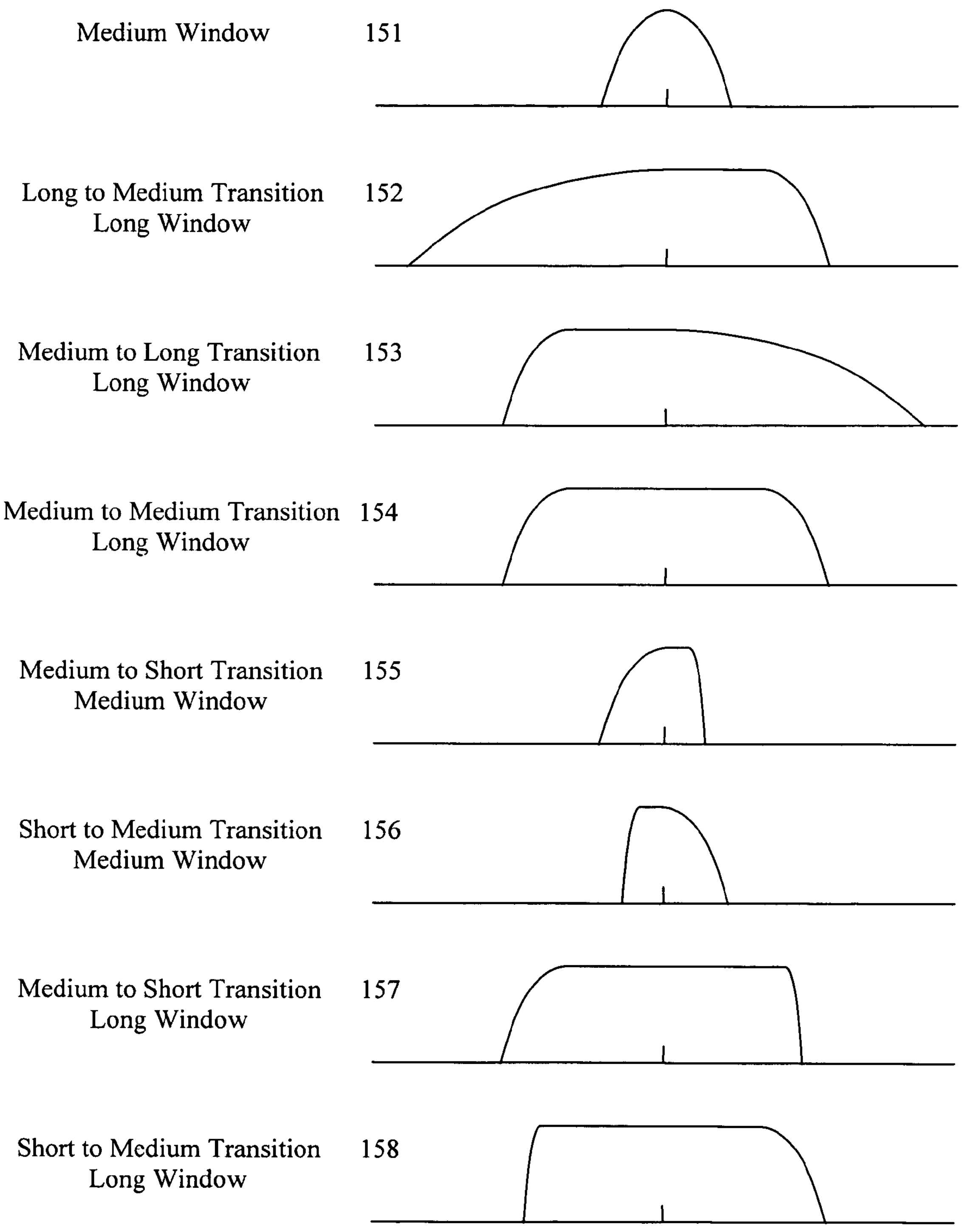
FIG. 9 are diagrammatic view of additional allowed window types, similar to FIG. 5, for switchable MDCT with three resolution modes, in accordance with the present invention.

A better embodiment of this invention that is free of blocking effects deploys a triad of MDCT with small, medium, and large block lengths. Due to the introduction of the medium resolution mode, the window types shown in FIG. 9 are allowed, in addition to those in FIG. 5. These windows are described below:

- Medium window 151.
- Long to medium transition long window 152: a long window that bridges the transition from a long window into a medium window.
- Medium to long transition long window 153: a long window that bridges the transition from a medium window into a long window.
- Medium to medium transition long window 154: a long window that bridges the transition from a medium window to another medium window.
- Medium to short transition medium window 155: a medium window that bridges the transition from a medium window to a short window.
- Short to medium transition medium window 156: a medium window that bridges the transition from a short window to a medium window.
- Medium to short transition long window 157: a long window that bridges the transition from a medium window to a short window.
- Short and medium transition long window 158: a long window that bridges the transition from a short window to a medium window.

Note that, similar to the short to short transition long window 65 in FIG. 5, the medium to medium transition long window 154, medium to short transition long window 157, and short to medium transition long window 158 enables the tri-mode MDCT to handle transients spaced as close as one frame apart.

Figure 10:
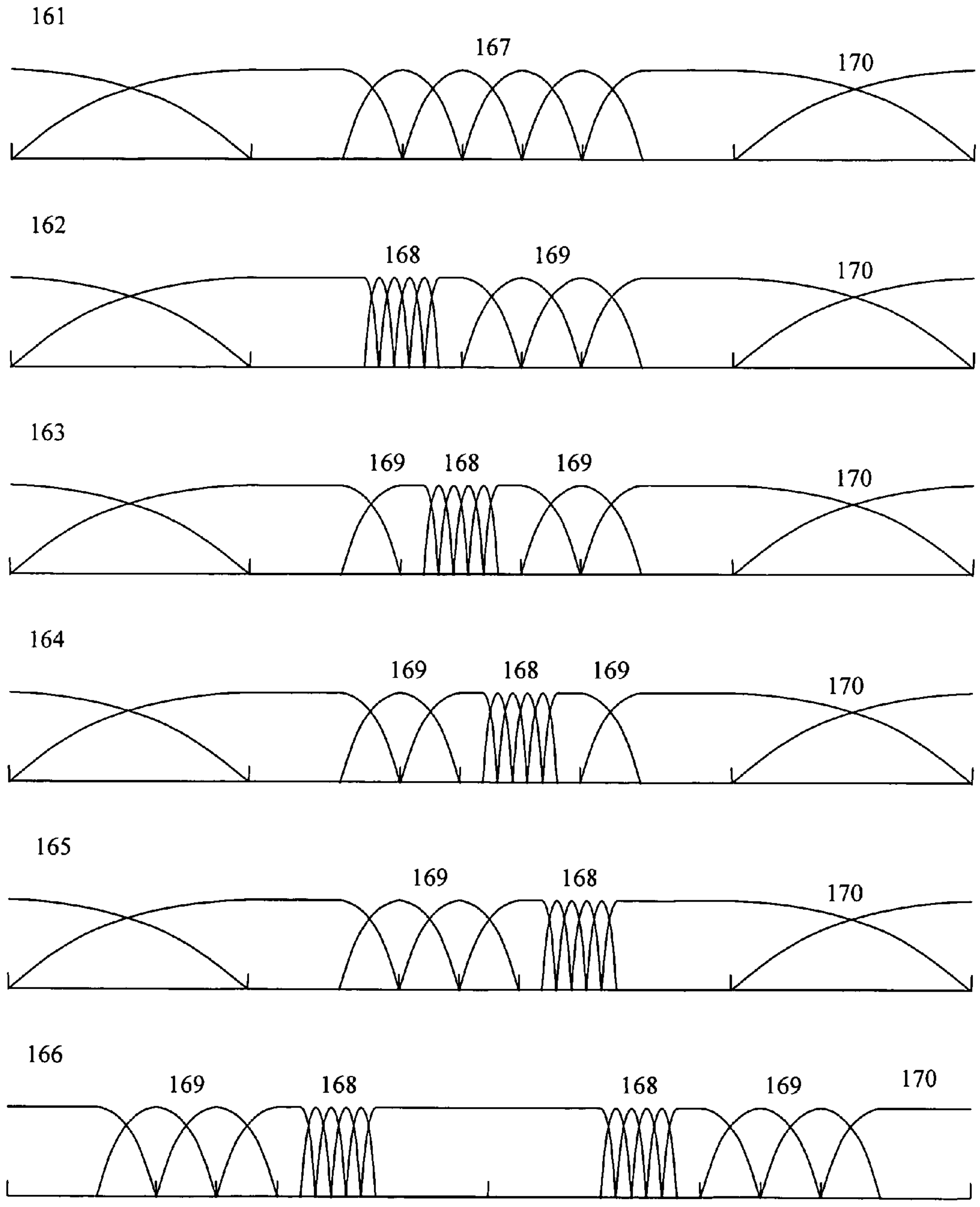
FIG. 10 is a depiction of a set of examples of window sequence for switchable MDCT with three resolution modes, in accordance with the present invention.

FIG. 10 shows some examples of window sequence. 161 demonstrates the ability of this embodiment to handle slow transient using medium resolution 167, while 162 through 166 demonstrates the ability to assign fine temporal resolution 168 to transient, medium temporal resolution 169 to stationary segments within the same frame, and high frequency resolution 170 to stationary frames.

The usual sum/difference coding methods 14 can be applied here. For example, a simple method for this might be as follows:

$$\text{Sum Channel}=0.5(\text{Left Channel}+\text{Right Channel})$$

$$\text{Difference Channel}=0.5(\text{Left Channel}-\text{Right Channel})$$

The usual joint intensity coding methods 15 can be applied here. A simple method might be to

- Replace the source channel with the sum of source and joint channels.
- Adjust it to the same energy level as the original source channel within a quantization unit,
- Discard subband samples of the joint channels within the quantization unit, only convey to the decoder the quantization index of the scale factor (referred to as "steering vector" or "scaling factor" in this invention) which is defined as:

$$\text{Steering Vector} = \sqrt{\frac{\text{Energy of Joint Channel}}{\text{Energy of Source Channel}}}$$

Nonuniform quantization of the steering vector, such as logarithmic, should be used in order to match the perception property of human ears. Entropy coding can be applied to the quantization indexes of the steering vectors.

In order to avoid the cancellation effect of source and joint channels when their phase difference is close to 180 degrees, polarity may be applied when they are summed to form the joint channel:

$$\text{Sum Channel}=\text{Source Channel}+\text{Polarity}\cdot\text{Joint Channel}.$$

The polarity must also be conveyed to the decoder.

A psychoacoustic model 23 calculates, based on perceptual properties of human ears, the masking threshold of the current input frame of audio samples, below which quantization noise is unlikely to be audible. Any usual psychoacoustic models can be applied here, but this invention requires that its psychoacoustic model outputs a masking threshold value for each of the quantization units.

A global bit allocator 16 globally allocates bit resource available to a frame in each quantization unit so that the quantization noise power in each quantization unit is below its respective masking threshold. It controls quantization noise power for each quantization unit by adjusting its quantization step size. All subband samples within a quantization unit are quantized using the same step size.

All the known bit allocation methods can be employed here. One such method is the well-known Water Filing Algorithm. Its basic idea is to find the quantization unit whose QNMR (Quantization Noise to Mask Ratio) is the highest and decrease the step size allocated to that quantization unit to reduce the quantization noise. It repeats this process until QNMR for all quantization units are less than one (or any other threshold) or the bit resource for the current frame is depleted.

The quantization step size itself must be quantized so it can be packed into the bit stream. Nonuniform quantization, such as logarithmic, should be used in order to match the perception property of human ears. Entropy coding can be applied to the quantization indexes of the step sizes.

The invention uses the step size provided by global bit allocation 16 to quantize all subband samples within each quantization unit 17. All linear or nonlinear, uniform or non-uniform quantization schemes may be applied here.

Interleaving 18 may be optionally invoked only when transient is present in the current frame. Let x(m,n,k) be the k-th quantization index in the m-th quasistationary segment and the n-th subband. (m, n, k) is usually the order that the quantization indexes are arranged. The interleaving section 18 reorders the quantization indexes so that they are arranged as (n, m, k). The motivation is that this rearrangement of quantization indexes may lead to fewer bits needed to encode the indexes than when the indexes are not interleaved. The decision of whether interleaving is invoked needs to be conveyed to the decoder as side information.

Figure 11:
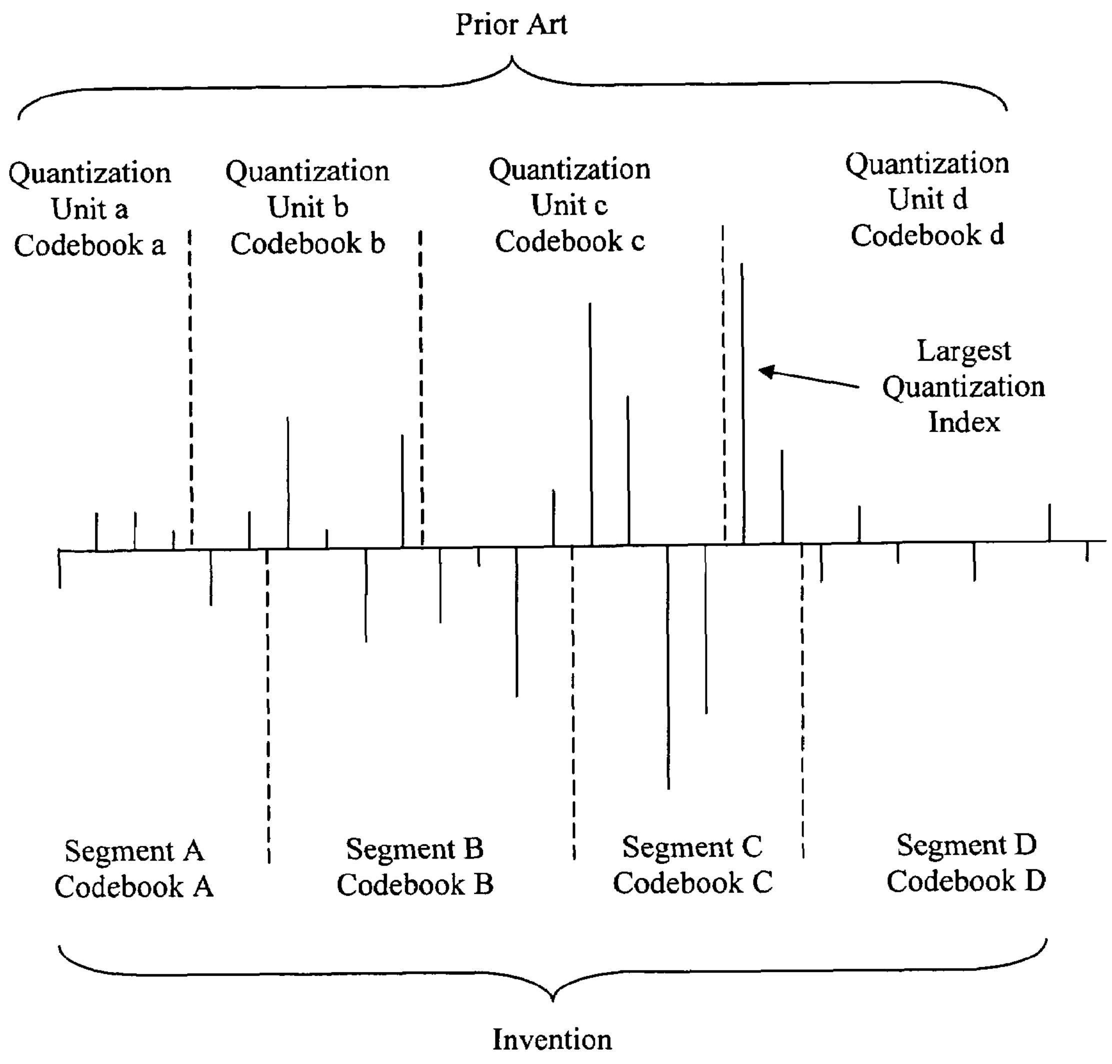
FIG. 11 is a diagrammatic view of the determination of entropy codebooks of the present invention as compared to the prior art.

In previous audio coding algorithms, the application range of an entropy codebook is the same as quantization unit, so the entropy code book is determined by the quantization indexes within the quantization unit (see top of FIG. 11). There is, therefore, no room for optimization.

This invention is completely different on this aspect. It ignores the existence of quantization units when it comes to codebook selection. Instead, it assigns an optimal codebook to each quantization index 19, hence essentially converts quantization indexes into codebook indexes. It then segments these codebook indexes into large segments whose boundaries define the ranges of codebook application. Obviously, these ranges of codebook application are very different from those determined by quantization units. They are solely based on the merit of quantization indexes, so the codebooks thus selected are better fit to the quantization indexes. Consequently, fewer bits are needed to convey the quantization indexes to the decoder.

The advantage of this approach versus previous arts is illustrated in FIG. 11. Let us look at the largest quantization index in the figure. It falls into quantization unit d and a large codebook would be selected using previous approaches. This large codebook is obviously not optimal because most of the indexes in quantization unit d are much smaller. Using the new approach of this invention, on the other hand, the same quantization index is segmented into segment C, so share a codebook with other large quantization indexes. Also, all quantization indexes in segment D are small, so a small codebook will be selected. Therefore, fewer bits are needed to encode the quantization indexes.

Figure 12:
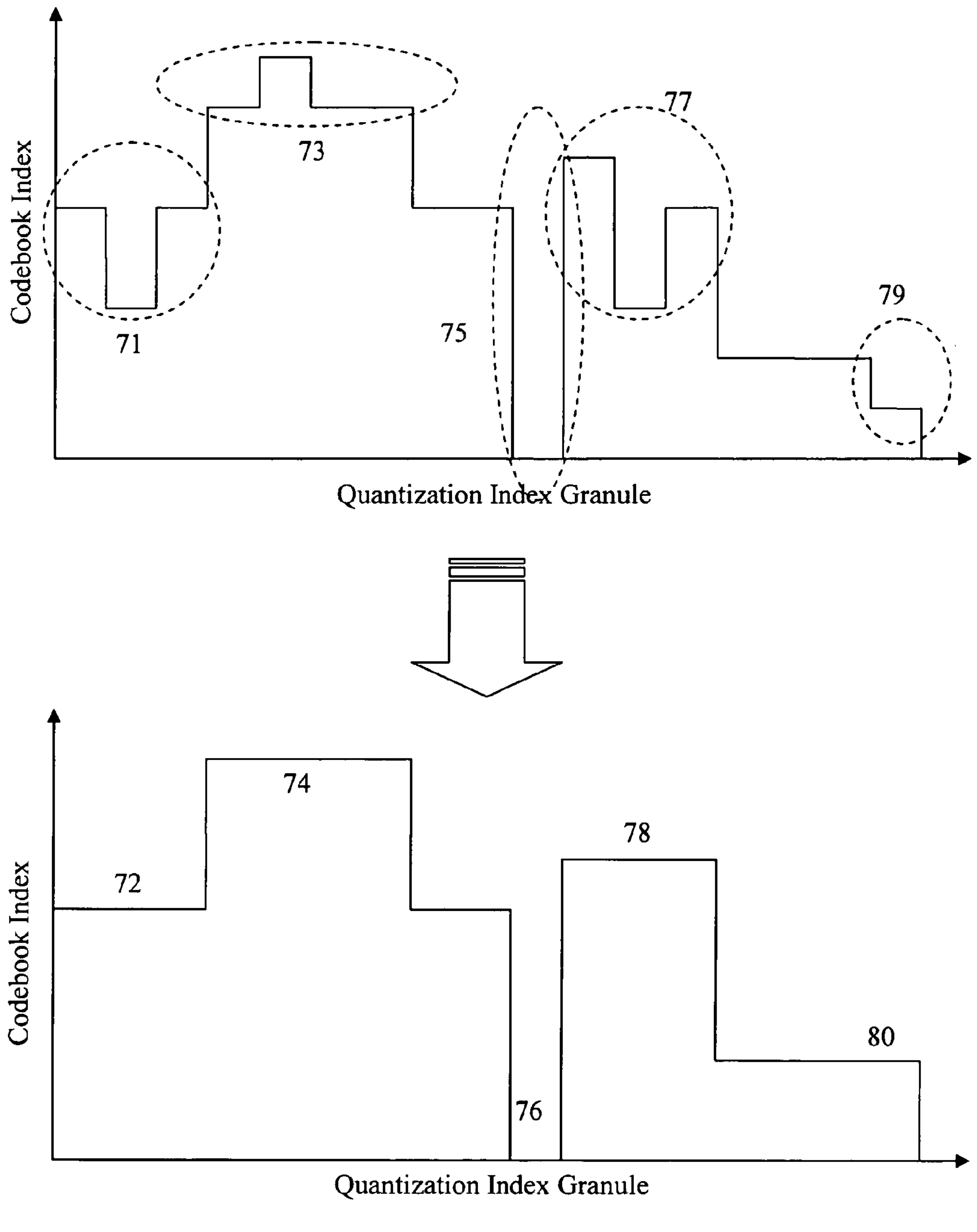
FIG. 12 is a diagrammatic view of the segmentation of codebook indexes into large segments, or the elimination of isolated pockets of codebook indexes, in accordance with the present invention.

With reference now to FIG. 12, the prior art systems only need to convey the codebook indexes to the decoder as side information, because their ranges of application are the same as the quantization units which are pre-determined. The new approach, however, need to convey the ranges of codebook application to the decoder as side information, in addition to the codebook indexes, since they are independent of the quantization units. This additional overhead might end up with more bits for the side information and quantization indexes overall if not properly handled. Therefore, segmentation of codebook indexes into larger segments is very critical to controlling this overhead, because larger segments mean that fewer codebook indexes and their ranges of application need to be conveyed to the decoder.

An embodiment of this invention deploys the following steps to accomplish this new approach to codebook selection:

1) Blocks quantization indexes into granules, each of which consists of P number of quantization indexes.
2) Determine the largest codebook requirement for each granule. For symmetric quantizers, this usually is represented by the largest absolute quantization index within each granule:

$$I_{max}(n) = \max_{k=0}^{P-1} |I(nP+k)|, \quad n \in \{\text{all granules}\}$$

where I(.) is the quantization index.

3) Assigns the smallest codebook to a granule that can accommodate its largest codebook requirement:

$$B(n) = \min_{\text{all codebook}} \{\text{Codebook that can accommodate } I_{max}(n)\}$$

4) Eliminate isolated pockets of codebook indexes which are smaller than their immediate neighbors by raising these codebook indexes to the least of their immediate neighbors. This is illustrated in FIG. 12 by the mappings of 71 to 72, 73 to 74, 77 to 78 and 79 to 80. Isolated pockets with deep dips into the codebook index that corresponds to zero quantization indexes may be excluded from this processing because this codebook indicates no codes need to be transferred. This is illustrated in FIG. 12 as the mapping of 75 to 76. This step obviously reduces the numbers of codebook indexes and their ranges of application that need to be conveyed to the decoder.

An embodiment of this invention deploys run-length code to encode the ranges of codebook application and the run-length codes can be further encoded with entropy code.

All quantization indexes are encoded 20 using codebooks and their respective ranges of application as determined by Entropy Codebook Selector 19.

The entropy coding may be implemented with a variety of Huffman codebooks. When the number of quantization levels in a codebook is small, multiple quantization indexes can be blocked together to form a larger Huffman codebook. When the number of quantization levels is too large (over 200, for example), recursive indexing should be used. For this, a large quantization index q can be represented as $$q=m\cdot M+r$$

where M is the modular, m is the quotient, and r is the remainder. Only m and r need to be conveyed to the decoder. Either or both of them can be encoded using Huffman code.

The entropy coding may be implemented with a variety of arithmetic codebooks. When the number of quantization levels is too large (over 200, for example), recursive indexing should also be used.

Other types of entropy coding may also be used in place of the above Huffman and arithmetic coding.

Direct packing of all or part of the quantization indexes without entropy coding is also a good option.

Since the statistical properties of the quantization indexes are obviously different when the variable resolution filter bank is in low and high resolution modes, an embodiment of this invention deploys two libraries of entropy codebooks to encode the quantization indexes in these two modes, respectively. A third library may be used for the medium resolution mode. It may also share the library with either the high or low resolution mode.

The invention multiplexes 21 all codes for all quantization indexes and other side information into a whole bit stream. The side information includes quantization step sizes, sample rate, speaker configuration, frame size, length of quasistationary segments, codes for entropy codebooks, etc. Other auxiliary information, such as time code, can also be packed into the bit stream.

Prior art systems needed to convey to the decoder the number of quantization units for each transient segment, because the unpacking of quantization step sizes, the codebooks of quantization, indexes, and quantization indexes themselves depends on it. In this invention, however, since the selection of quantization index codebook and its range of application are decoupled from quantization units by the special methodology of entropy codebook selection 19, the bit stream can be structured in such a way that the quantization indexes can be unpacked before the number of quantization units is needed. Once the quantization indexes are unpacked, they can be used to reconstruct the number of quantization units. This will be explained in the decoder.

Figure 16:
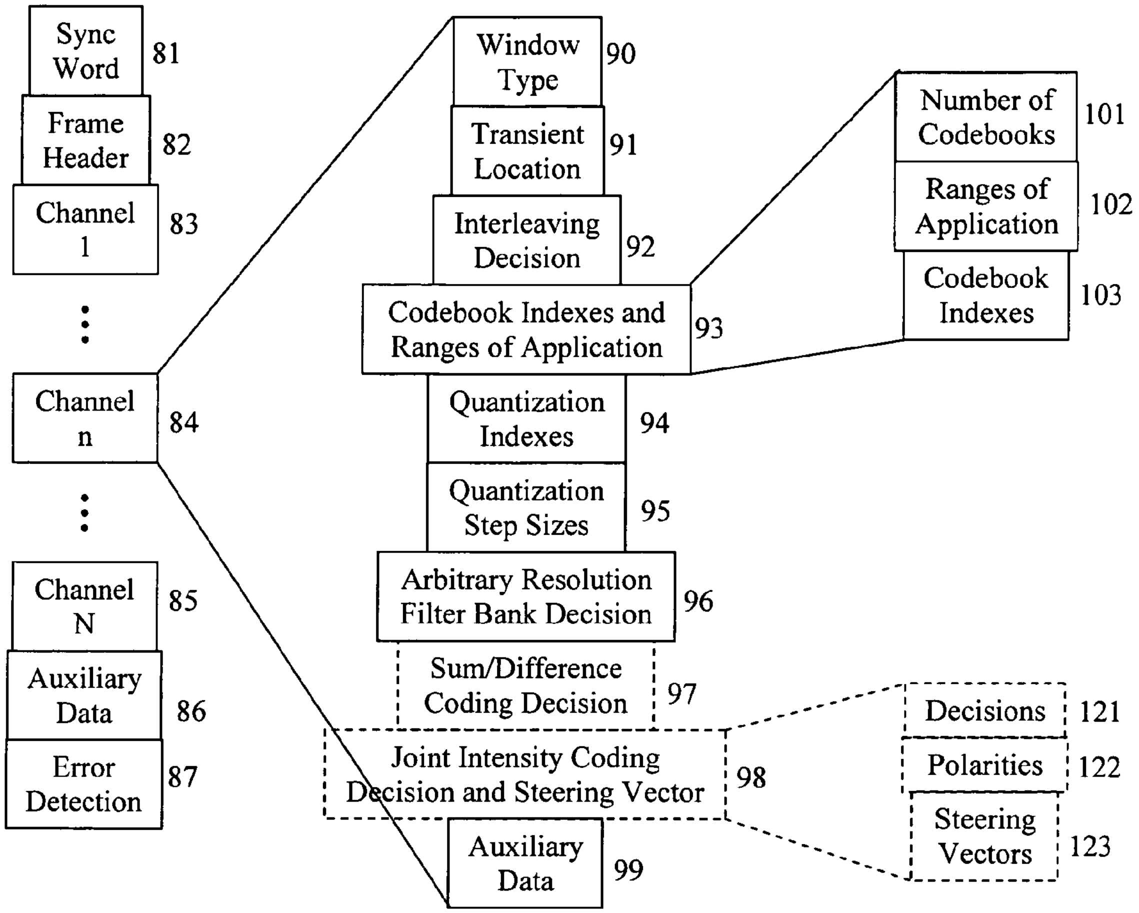
FIG. 16 is a diagrammatic view of a bit stream structure when the half hybrid filter bank or the switchable filter bank plus ADPCM is used, in accordance with the present invention.

With the above consideration in mind, an embodiment of this invention uses a bit stream structure as shown in FIG. 16 when the half hybrid filter bank or the switchable filter bank plus ADPCM is used. It essentially consists of the following sections:

- Sync Word 81: Indicates the start of a frame of audio data.
- Frame Header 82: Contains information about the audio signal, such as sample rate, number of normal channels, number of LFE (low frequency effect) channels, speaker configuration, etc.
- Channel 1, 2, . . . , N 83,84,85: All audio data for each channel are packed here.
- Auxiliary Data 86: Contains auxiliary data such as time code.
- Error Detection 87: Error detection code is inserted here to detect the occurrence of error in the current frame so that error handling procedures can be incurred upon the detection of bit stream error.

The audio data for each channel is further structured as follows:

- Window Type 90: Indicates which window such as those shown in FIG. 5 is used in the encoder so that the decoder can use the same window.
- Transient Location 91: Appears only for frames with transient. It indicates the location of each transient segment. If run-length code is used, this is where the length of each transient segment is packed.
- Interleaving Decision 92: One bit, only in transient frames, indicating if the quantization indexes for each transient segment are interleaved so that the decoder knows whether to de-interleave the quantization indexes.
- Codebook Indexes and Ranges of Application 93: It conveys all information about entropy codebooks and their respective ranges of application for quantization indexes. It consists of the following sections:
  - Number of Codebooks 101: Conveys the number of entropy codebooks for each transient segment for the current channel.
  - Ranges of Application 102: Conveys the ranges of application for each entropy codebooks in terms of quantization indexes or granules. They may be further encoded with entropy codes.
  - Codebook Indexes 103: Conveys the indexes to entropy codebooks. They may be further encoded with entropy codes.
- Quantization Indexes 94: Conveys the entropy codes for all quantization indexes of current channel.
- Quantization Step Sizes 95: Carries the indexes to quantization step sizes for each quantization unit. It may be further encoded with entropy codes. As explained before, the number of step size indexes, or the number of quantization units, will be reconstructed by the decoder from the quantization indexes as shown in 49.
- Arbitrary Resolution Filter Bank Decision 96: One bit for each quantization unit. It appears only when the switchable resolution analysis filter bank 28 is in low frequency resolution mode. It instructs the decoder whether or not to perform the arbitrary resolution filter bank reconstruction (51 or 55) for all the subband segments within the quantization unit.
- Sum/Difference Coding Decision 97: One bit for one of the quantization unit that is sum/difference coded. It is optional and appears only when sum/difference coding is deployed. It instructs the decoder whether to performance sum/difference decoding 47.
- Joint Intensity Coding Decision and Steering Vector 98: It conveys the information for the decoder whether to do joint intensity decoding. It is optional and appears only for the quantization units of the joint channel that are joint-intensity coded and only when joint intensity coding is deployed by the encoder. It consists of the following sections:
  - Decisions 121: One bit for each joint quantization unit, indicating to the decoder whether to do joint channel decoding for the subband samples in the quantization unit.
  - Polarities 122: One bit for each joint quantization unit, representing the polarity of the joint channel with respect to the source channel:

$$\text{Polarity} = \begin{cases} 1 & \text{if polarity bit} = 0 \\ -1 & \text{otherwise} \end{cases}$$

- Steering Vectors 123: One scale factor per joint quantization unit. It may be entropy-coded.
- Auxiliary Data 99: Contains auxiliary data such as information for dynamic range control.

When the tri-mode switchable filter bank is used, the bit stream structure is essentially the same as above, except:

Window Type 90: Indicates which window such as those shown in FIG. 5 and FIG. 9 is used in the encoder so that the decoder can use the same window. Note that, for frames with transient, this window type only refers to the last window in the frame because the rest can be inferred from this window type, the location of transient, and the last window used in the last frame.

Transient Location 91: Appears only for frames with transient. It first indicates whether this frame is one with slow transient 171. If not, it then indicates the transient location in terms of medium blocks 172 and then in terms of short blocks 173.

Arbitrary Resolution Filter Bank Decision 96: It is irrelevant and hence not used.

Decoder

Figure 13:
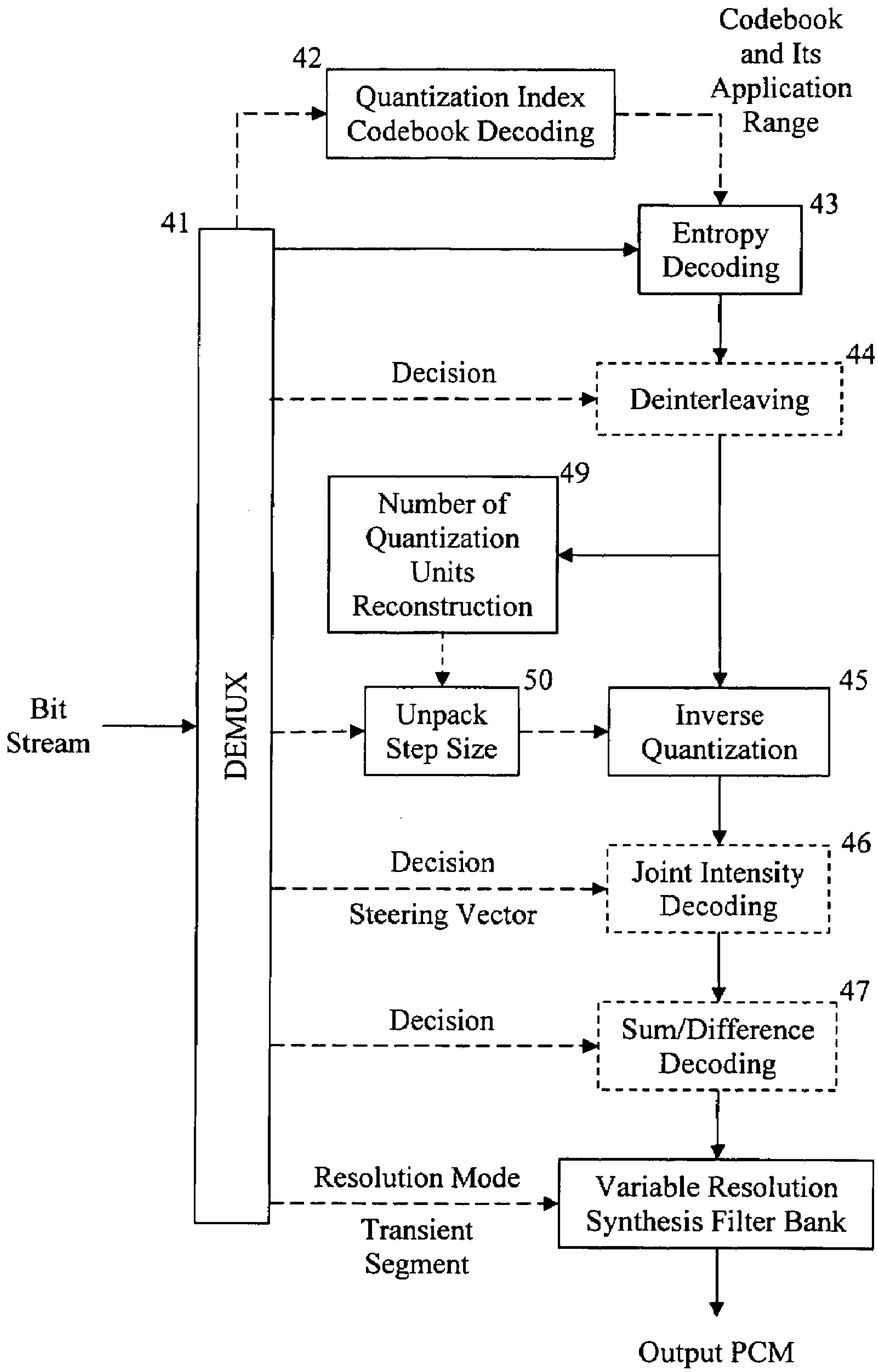
FIG. 13 is a diagrammatic view of a decoder embodying the present invention.

The decoder of this invention implements essentially the inverse process of the encoder. It is shown in FIG. 13 and explained as follows.

A demultiplexer 41, from the bit stream, codes for quantization indexes and side information, such as quantization step size, sample rate, speaker configuration, and time code, etc. When prefix entropy code, such as Huffman code, is used, this step is an integrated single step with entropy decoding.

A Quantization Index Codebook Decoder 42 decodes entropy codebooks for quantization indexes and their respective ranges of application from the bit stream.

An Entropy Decoder 43 decodes quantization indexes from the bit stream based on the entropy codebooks and their respective ranges of application supplied by Quantization Index Codebook Decoder 42.

Deinterleaving 44 is optionally applicable only when there is transient in the current frame. If the decision bit unpacked from the bit stream indicates that interleaving 18 was invoked in the encoder, it deinterleaves the quantization indexes. Otherwise, it passes quantization indexes through without any modification.

The invention reconstructs the number of quantization units from the non-zero quantization indexes for each transient segment 49. Let q(m,n) be the quantization index of the n-th subband for the m-th transient segment (if there is no transient in the frame, there is only one transient segment), find the largest subband with non-zero quantization index:

$$Band_{max}(m) = \max_{n}\{n \mid q(m, n) \neq 0\}$$

for each transient segment m.

Recall that a quantization unit is defined by critical band in frequency and transient segment in time, so the number of quantization unit for each transient segment is the smallest critical band that can accommodate the $\text{Band}_{max}$(m). Let Band(Cb) be the largest subband for the Cb-th critical band, the number of quantization units can be found as follows $$N(m) = \min_{Cb}\{Cb \mid \text{Band}(Cb) \geq \text{Band}_{max}(m)\}$$

for each transient segment m.

Quantization Step Size Unpacking 50 unpacks quantization step sizes from the bit stream for each quantization unit.

Inverse Quantization 45 reconstructs subband samples from quantization indexes with respective quantization step size for each quantization unit.

If the bit stream indicates that joint intensity coding 15 was invoked in the encoder, Joint Intensity Decoding 46 copies subband samples from the source channel and multiplies them with polarity and steering vector to reconstruct subband samples for the joint channels:

Joint Channel=Polarity·Steering Vector·Source Channel

If the bit stream indicates that sum/difference coding 14 was invoked in the encoder, Sum/Difference Decoder 47 reconstructs the left and right channels from the sum and difference channels. Corresponding to the sum/difference coding example explained in Sum/Difference Coding 14, the left and right channel can be reconstructed as:

Left Channel=Sum Channel+Difference Channel

Right Channel=Sum Channel−Difference Channel

The decoder of the present invention incorporates a variable resolution synthesis filter bank 48, which is essentially the inverse of the analysis filter bank used to encode the signal.

If the tri-mode switchable resolution-analysis filter bank is used in the encoder, the operation of its corresponding synthesis filter bank is uniquely determined and requires that the same sequence of windows be used in the synthesis process.

Figure 14:
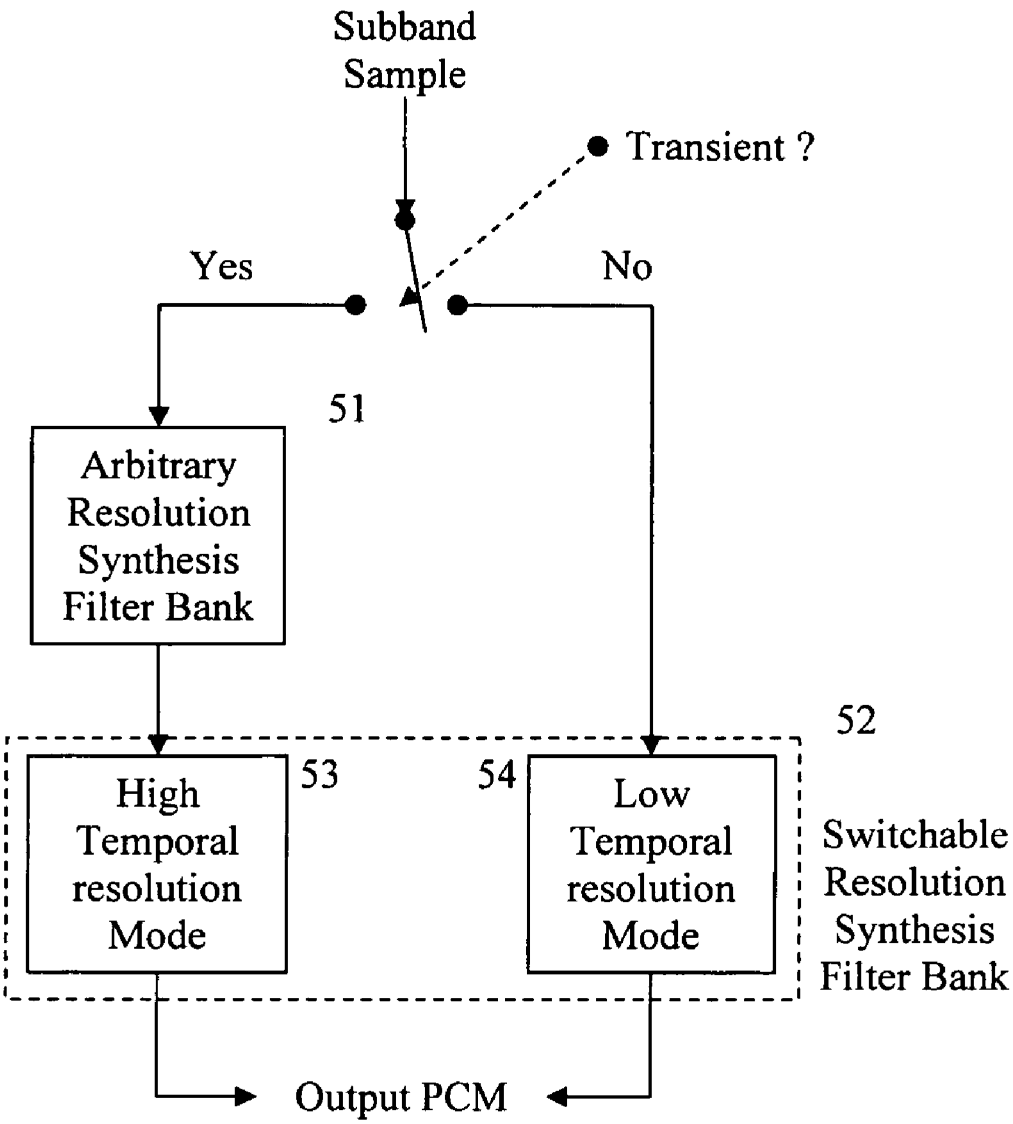
FIG. 14 is a diagrammatic view of a variable resolution synthesis filter bank with arbitrary resolution filter banks in accordance with the present invention.
Figure 15:
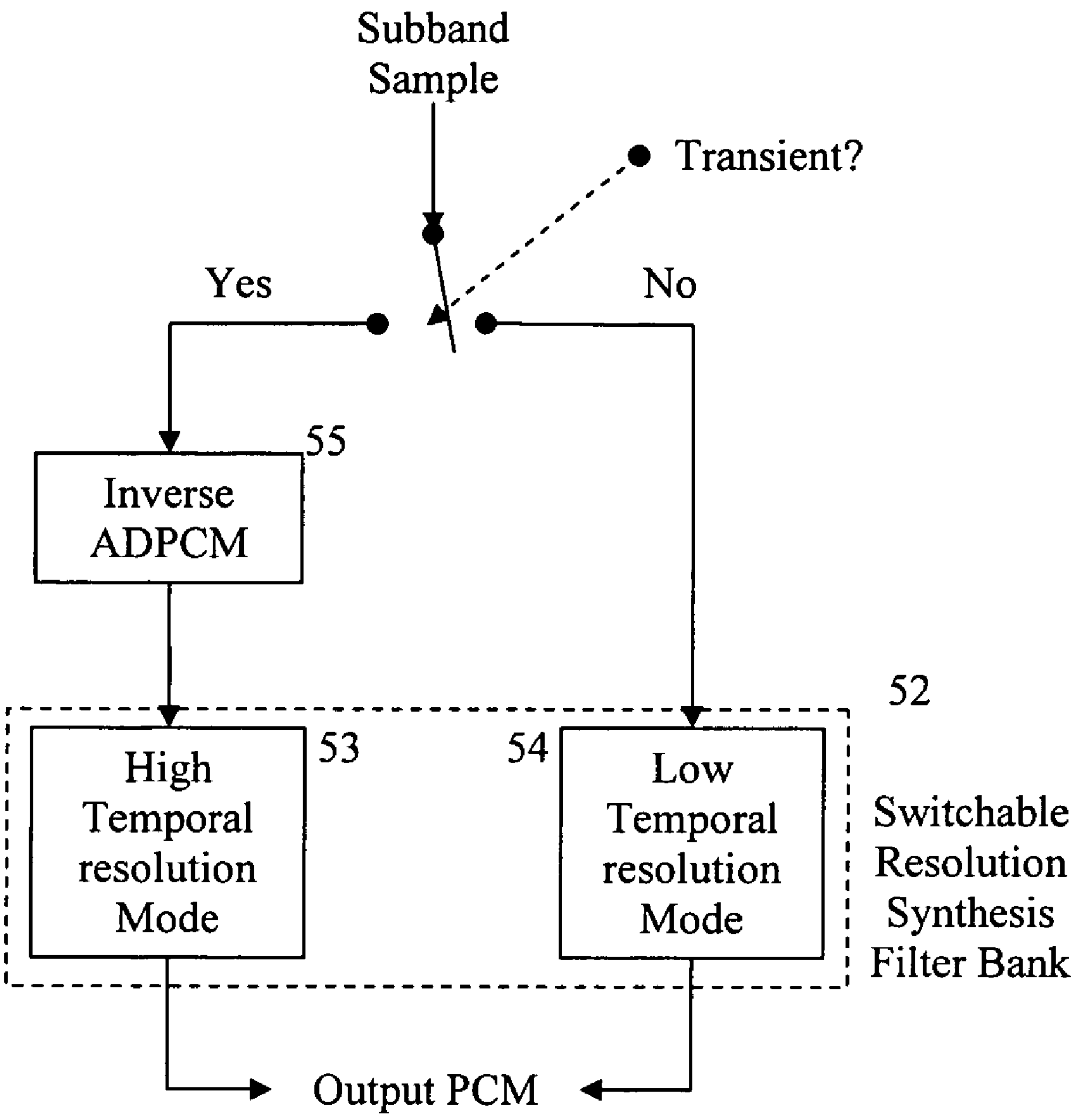
FIG. 15 is a diagrammatic view of a variable resolution synthesis filter bank with inverse ADPCM.

If the half hybrid filter bank or the switchable filter bank plus ADPCM is used in the encoder, the decoding process is described as follows:

If the bit stream indicates that the current frame was encoded with the switchable resolution analysis filter bank 28 in high frequency resolution mode, the switchable resolution synthesis filter bank 54 enters high frequency resolution mode accordingly and reconstructs PCM samples from subband samples (see FIG. 14 and FIG. 15).

If the bit stream indicates that the current frame was encoded with the switchable resolution analysis filter bank 28 in low frequency resolution mode, the subband samples are first fed to the arbitrary resolution synthesis filter bank 51 (FIG. 14) or inverse ADPCM 55 (FIG. 15), depending whichever was used in the encoder, and went through their respective synthesis process. Afterwards, PCM samples are reconstructed from these synthesized subband samples by the switchable resolution synthesis filter bank in low frequency resolution mode 53.

The synthesis filter banks 52, 51 and 55 are the inverse of analysis filter banks 28, 26, and 29, respectively. Their structures and operation processes are uniquely determined by the analysis filter banks. Therefore, whatever analysis filter bank is used in the encoder, its corresponding synthesis filter bank must be used in the decoder.

Low Coding Delay Mode

When the high frequency resolution mode of the switchable resolution analysis bank is disallowed by the encoder, the frame size may be subsequently reduced to the block length of the switchable resolution filter bank at low frequency mode or a multiple of it. This results in a much smaller frame size, hence much lower delay necessary for the encoder and the decoder to operate. This is the low coding delay mode of this invention.

Although several embodiments have been described in detail for purposes of illustration, various modifications may be made to each without departing from the scope and spirit of the invention. Accordingly, the invention is not to be limited, except as by the appended claims.

What is claimed is:

1. A method for decoding a digital audio signal, comprising the steps of:

receiving an encoded audio data stream that includes: entropy-encoded quantization indexes for an audio signal, indexes for assigned entropy codebooks that were used to encode the entropy-encoded quantization indexes, and codebook application ranges identifying segments of the entropy-encoded quantization indexes that were encoded by the respective entropy codebooks, wherein the codebook application ranges have been selected based on local properties of the quantization indexes, so that the codebook application ranges are independent of block quantization boundaries, meaning that at least one boundary between the codebook application ranges for different entropy codebooks is different than any of the block quantization boundaries;

unpacking the data stream;

decoding the entropy-encoded quantization indexes using the entropy codebooks within the respective identified codebook application ranges, thereby obtaining decoded quantization indexes;

reconstructing subband samples that represent the audio signal in a frequency domain from the decoded quantization indexes; and processing the reconstructed subband samples using a synthesis filter bank, thereby transforming the reconstructed subband samples into audio pulse code modulation (PCM) samples of the audio signal.

2. The method of claim 1, wherein when the encoded data stream indicates that a current frame was encoded with a switchable resolution analysis filter bank in low frequency resolution mode, the synthesis filter bank acts as a two-stage hybrid filter bank, wherein a first stage comprises either an arbitrary resolution synthesis filter bank or an inverse adaptive differential pulse code modulation (ADPCM), and wherein the second stage is a low frequency resolution mode of the synthesis filter bank.

3. The method of claim 1, wherein when the data stream indicates that the current frame was encoded with a switchable resolution analysis filter bank in high frequency resolution mode, the synthesis filter bank operates in a high frequency resolution mode.

4. The method of claim 1, wherein the unpacking the data stream step is performed using a demultiplexer.

5. The method of claim 1, wherein the decoding step is performed using an entropy decoder to decode the entropy codebooks and a run-length decoder to decode their respective application ranges from the data stream.

6. The method of claim 1, including the step of reconstructing a number of quantization units from the decoded quantization indexes.

7. The method of claim 1, including the step of rearranging the quantization indexes when a transient is indicated in a current frame.

8. The method of claim 7, wherein the rearranging step is performed using a deinterleaver.

9. The method of claim 1, including the step of reconstructing joint channel subband samples from source channel subband samples using joint intensity scale factors.

10. The method of claim 9, wherein the joint channel reconstructing step is performed using a joint intensity decoder.

11. The method of claim 1, including the step of reconstructing left and right channel subband samples from sum and difference subband channels.

12. The method of claim 11, wherein the left and right channel reconstructing step is performed using a sum/difference decoder.

13. A method for encoding a digital audio signal, comprising the steps of:

segmenting input pulse code modulation (PCM) samples of an audio signal into a frame;

processing the PCM audio samples in the frame by using an analysis filter bank so as to transform the PCM audio samples into subband samples that represent the audio signal in a frequency domain;

identifying quantization indexes for the subband samples in the frame based on block quantization boundaries for the subband samples;

providing at least one library of pre-designed entropy codebooks;

assigning entropy codebooks, from among the pre-designed entropy codebooks, to segments of the quantization indexes based on local properties of the quantization indexes, resulting in codebook application ranges independent of the block quantization boundaries, meaning that at least one boundary between the codebook application ranges for different entropy codebooks is different than any of the block quantization boundaries, the codebook application ranges being the ranges of the quantization indexes which the respective entropy codebooks are used to encode;

encoding the quantization indexes using the assigned entropy codebooks within the respective codebook application ranges;

creating an encoded data stream, including the encoded quantization indexes, indexes for the assigned entropy codebooks and the respective codebook application ranges; and at least one of storing or transmitting the encoded data stream.

14. The method of claim 13, wherein the entropy codebook assignment step includes the step of converting the quantization indexes to codebook indexes by assigning to each quantization index the smallest available entropy codebook, in terms of number of quantization indexes accommodated, that can accommodate the index.

15. The method of claim 13, wherein the frame is between 2 and 50 ms in duration.

16. The method of claim 13, wherein the processing step includes the step of using a variable-resolution filter bank, selectively switchable between high and low frequency resolution modes.

17. The method of claim 16, including a step of detecting transients, wherein when no transient is detected the high frequency resolution mode is used, and wherein when a transient is detected the variable-resolution filter bank is switched to the low frequency resolution mode.

18. The method of claim 17, wherein upon switching the variable-resolution filter bank to the low frequency resolution mode, subband samples are segmented into stationary segments within the frame.

19. The method of claim 18, including the step of applying to corresponding subband samples in individual ones of the stationary segments an arbitrary resolution filter bank or adaptive differential pulse code modulation (ADPCM).

20. The method of claim 19, wherein the variable-resolution filter bank is configured to include a long window that is capable of bridging a transition from a short window immediately to another short window so as to handle transients that are spaced by only a single long window apart.

21. The method of claim 13, wherein the processing step includes the step of using a variable-resolution filter bank, selectively switchable between high, low and intermediate frequency resolution modes, such that multiple resolutions can be applied in a single frame when a transient is detected.

22. The method of claim 13, wherein the identifying quantization indexes step includes a step of using a step size supplied by a bit allocator that allocates bit resources into groups of subband samples such that the quantization noise power is below a masking threshold.

23. The method of claim 13, including the step of calculating masking thresholds.

24. The method of claim 23, wherein the calculating step is performed using a psychoacoustic model.

25. The method of claim 13, including the step of converting subband samples in left and right channel pairs into sum and difference channel pairs.

26. The method of claim 25, wherein the converting step is performed using a sum/difference encoder.

27. The method of claim 13, including the steps of extracting intensity scale factor of a joint channel versus a source channel, merging the joint channel into the source channel, and discarding all relevant subband samples in the joint channel.

28. The method of claim 27, wherein the extracting and merging steps are performed using a joint intensity coder.

29. The method of claim 13, including the step of rearranging quantization indexes when a transient is present in a frame to reduce the total number of bits.

30. The method of claim 13, including the step of providing a run-length encoder for encoding application boundaries of the entropy codebooks.

31. The method of claim 13, including the step of applying a transient segmentation algorithm when a transient is detected.

32. The method of claim 13, wherein the creating an encoded data stream step is performed using a multiplexer.

33. The method of claim 13, wherein the block quantization boundaries define different quantization units, and wherein all subband samples within any given quantization unit are quantized using the same step size.

34. The method of claim 13, wherein the entropy codebook assignment step includes a step of converting the quantization indexes to codebook indexes by assigning to individual granules, each containing at least one quantization index, the smallest available entropy codebook, in terms of number of quantization indexes accommodated, that can accommodate each said individual granule.

35. The method of claim 34, wherein the entropy codebook assignment step further includes eliminating isolated pockets of codebook indexes that are smaller than their immediate neighbors by raising these codebook indexes to the least of their immediate neighbors.

36. The method of claim 13, wherein the codebook application ranges are based solely on the quantization indexes.

37. The method of claim 13, further comprising a step of encoding the codebook indexes and their respective codebook application ranges prior to including them within the encoded data stream.

38. The method of claim 13, wherein the processing step includes processing across input channels.

39. The method of claim 38, wherein the processing across input channels includes generating a sum channel and a difference channel from left and right input channels.

40. A method for encoding a digital audio signal, comprising the steps of:

segmenting input pulse code modulation (PCM) samples of an audio signal into a frame;

processing the PCM samples of the audio signal in the frame so as to transform the PCM samples of the audio signal into subband samples that represent the audio signal in a frequency domain, using a variable-resolution filter bank selectively switchable between high and low frequency resolution modes;

detecting transients, wherein when no transient is detected the high frequency resolution mode is used, and wherein when a transient is detected the variable-resolution filter bank is switched to the low frequency resolution mode, subband samples are segmented into stationary segments within the frame based on a location of the transient within the frame, and an arbitrary resolution filter bank or adaptive differential pulse code modulation (ADPCM) is applied to corresponding subband samples in individual ones of the stationary segments;

identifying quantization indexes for the subband samples in the frame based on block quantization boundaries for the subband samples;

providing at least one library of pre-designed entropy codebooks;

assigning entropy codebooks, from among the pre-designed entropy codebooks, to segments of quantization indexes based on local properties of the quantization indexes, resulting in codebook application ranges independent of the block quantization boundaries, meaning that at least one boundary between the codebook application ranges for different entropy codebooks is different than any of the block quantization boundaries, the codebook application ranges being the ranges of the quantization indexes which the respective entropy codebooks are used to encode;

encoding the quantization indexes using the assigned entropy codebooks within the respective codebook application ranges;

creating an encoded data stream, including the encoded quantization indexes, indexes for the assigned entropy codebooks and the respective codebook application ranges; and at least one of storing or transmitting the encoded data stream.

41. The method of claim 40, wherein the entropy codebook assignment step includes the step of converting the quantization indexes to codebook indexes by assigning to each quantization index the smallest available entropy codebook, in terms of number of quantization indexes accommodated, that can accommodate the index.

42. The method of claim 40, wherein the identifying quantization indexes step includes a step of using a step size supplied by a bit allocator that allocates bit resources into groups of subband samples such that the quantization noise power is below a masking threshold.

43. The method of claim 40, including the step of calculating a masking threshold using a psychoacoustic model.

44. The method of claim 40, including the step of converting subband samples in left and right channel pairs into sum and difference channel pairs using a sum/difference encoder.

45. The method of claim 40, including the steps of using a joint intensity coder to extract intensity scale factor of a joint channel versus a source channel and merge the joint channel into the source channel, and discarding all relevant subband samples in the joint channel.

46. The method of claim 40, including the step of providing a run-length encoder for encoding application boundaries of the entropy codebooks.

47. A method for decoding an encoded audio data stream, comprising the steps of:

receiving the encoded audio data stream;

unpacking the data stream;

decoding entropy-encoded quantization indexes for an audio signal from the data stream, thereby obtaining decoded quantization indexes;

reconstructing subband samples that represent the audio signal in a frequency domain from the decoded quantization indexes; and processing the reconstructed subband samples, thereby transforming the reconstructed subband samples into pulse code modulation (PCM) samples of the audio signal, using a variable-resolution synthesis filter bank selectively switchable between low and high frequency resolution modes, wherein when the data stream indicates that a current frame was encoded with a switchable resolution analysis filter bank in low frequency resolution mode, the variable-resolution synthesis filter bank acts as a two-stage hybrid filter bank, wherein a first stage applies either an arbitrary resolution synthesis filter bank or an inverse adaptive differential pulse code modulation (ADPCM) to identified stationary segments within the current frame in order to recover original subband samples, and wherein a second stage applies the low frequency resolution mode of the variable-resolution synthesis filter bank to the recovered original subband samples in order to generate the audio PCM samples, wherein when the data stream indicates that the current frame was encoded with a switchable resolution analysis filter bank in high frequency resolution mode, the variable resolution synthesis filter bank operates in a high frequency resolution mode to generate the audio PCM samples, wherein the decoding step is performed using an entropy decoder to decode indexes for entropy codebooks and a run-length decoder adapted to decode respective codebook application ranges from the data stream, the codebook application ranges identifying segments of quantization indexes that were encoded by the respective entropy codebooks, and wherein the codebook application ranges have been selected based on local properties of the quantization indexes, so that the codebook application ranges are independent of block quantization boundaries, meaning that at least one boundary between the codebook application ranges for different entropy codebooks is different than any of the block quantization boundaries.

48. The method of claim 47, wherein the unpacking the data stream step is performed using a demultiplexer.

49. The method of claim 47, including the step of reconstructing the number of quantization units from the decoded quantization indexes.

50. The method of claim 47, including the step of rearranging the quantization indexes when a transient is detected in a current frame.

51. The method of claim 50, wherein the rearranging step is performed using a deinterleaver.

52. The method of claim 47, including the step of reconstructing joint channel subband samples from source channel subband samples using joint intensity scale factors.

53. The method of claim 52, wherein the joint channel reconstructing step is performed using a joint intensity decoder.

54. The method of claim 47, including the step of reconstructing left and right channel subband samples from sum and difference subband channels.

55. The method of claim 54, wherein the left and right channel reconstructing step is performed using a sum/difference decoder.

56. A method for encoding a digital audio signal, comprising the steps of:

processing input PCM samples of an audio signal by using an analysis filter bank so as to transform the input PCM audio samples into subband samples that represent the audio signal in a frequency domain;

creating quantization indexes by quantizing the subband samples;

converting the quantization indexes to codebook indexes by assigning to individual granules, each of said granules containing at least one quantization index, from a plurality of available cookbooks, the smallest codebook, in terms of number of quantization indexes accommodated, that can accommodate each said individual granule, with each range of contiguous granules having the same codebook index being an application range for said codebook;

eliminating pockets of codebook indexes that are smaller than their immediate neighbors by raising these codebook indexes to the least of their immediate neighbors, thereby expanding the application ranges of individual codebooks;

encoding the quantization indexes using the codebooks applicable within the respective application ranges;

creating an encoded data stream, including the encoded quantization indexes, indexes for the codebooks and the respective codebook application ranges; and at least one of storing or transmitting the encoded data stream.

57. The method of claim 56, wherein the processing step includes the step of using a variable-resolution filter bank, selectively switchable between high and low frequency resolution modes.

58. The method of claim 57, including a step of detecting transients, wherein when no transient is detected the high frequency resolution mode is used, and wherein when a transient is detected the variable-resolution filter bank is switched to the low frequency resolution mode.

59. The method of claim 58, wherein upon switching the variable-resolution filter bank to the low frequency resolution mode, subband samples are segmented into stationary segments.

60. The method of claim 59, including the step of applying to corresponding subband samples in individual ones of the stationary segments an arbitrary resolution filter bank or adaptive differential pulse code modulation (ADPCM).

61. The method of claim 60, wherein the variable-resolution filter bank is configured to include a long window that is capable of bridging a transition from a short window immediately to another short window so as to handle transients that are spaced by only a single long window apart.

62. The method of claim 56, wherein the processing step includes the step of using a variable-resolution filter bank, selectively switchable between high, low and intermediate frequency resolution modes, such that multiple resolutions can be applied in a single frame when a transient is detected.

63. The method of claim 56, wherein the creating quantization indexes step includes a step of using a step size supplied by a bit allocator that allocates bit resources into groups of subband samples such that the quantization noise power is below a masking threshold.

64. The method of claim 56, including the step of calculating masking thresholds.

65. The method of claim 64, wherein the calculating step is performed using a psychoacoustic model.

66. The method of claim 56, including the step of converting subband samples in left and right channel pairs into sum and difference channel pairs.

67. The method of claim 66, wherein the converting step is performed using a sum/difference encoder.

68. The method of claim 56, including the steps of extracting intensity scale factor of a joint channel versus a source channel, merging the joint channel into the source channel, and discarding all relevant subband samples in the joint channel.

69. The method of claim 68, wherein the extracting and merging steps are performed using a joint intensity coder.

70. The method of claim 56, including the step of rearranging quantization indexes when a transient is present in a frame to reduce the total number of bits.

71. The method of claim 56, including the step of providing a run-length encoder for encoding application boundaries of the entropy codebooks.

72. The method of claim 56, including the step of applying a transient segmentation algorithm when a transient is detected.

73. The method of claim 56, wherein the creating an encoded data stream step is performed using a multiplexer.

74. The method of claim 56, wherein the block quantization boundaries define different quantization units, and wherein all subband samples within any given quantization unit are quantized using the same step size.

75. The method of claim 56, wherein the codebook application ranges are based solely on the quantization indexes.

76. The method of claim 56, further comprising a step of encoding the codebook indexes and their respective codebook application ranges prior to including them within the encoded data stream.

77. The method of claim 56, wherein the processing step includes processing across input channels.

78. The method of claim 77, wherein the processing across input channels includes generating a sum channel and a difference channel from left and right input channels.

* * * * *

UNITED STATES PATENT AND TRADEMARK OFFICE

CERTIFICATE OF CORRECTION

PATENT NO. : 7,630,902 B2
APPLICATION NO. : 11/029722
DATED : December 8, 2009
INVENTOR(S) : Yuli You It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1375 days.

Signed and Sealed this

Second Day of November, 2010

David J. Kappos

*Director of the United States Patent and Trademark Office*